US007966234B1

(12) United States Patent
Merves et al.

(10) Patent No.: US 7,966,234 B1
(45) Date of Patent: Jun. 21, 2011

(54) STRUCTURED FINANCE PERFORMANCE ANALYTICS SYSTEM

(75) Inventors: Jay Merves, West Windsor, NJ (US); Michael London, New York, NY (US)

(73) Assignee: JPMorgan Chase Bank. N.A., New York, NY (US)

( * ) Notice: Subject to any disclaimer, the term of this patent is extended or adjusted under 35 U.S.C. 154(b) by 786 days.

(21) Appl. No.: 09/470,180

(22) Filed: Dec. 22, 1999

Related U.S. Application Data

(60) Provisional application No. 60/134,470, filed on May 17, 1999.

(51) Int. Cl.
*G06Q 40/00* (2006.01)

(52) U.S. Cl. ........................................ 705/35; 705/36 R

(58) Field of Classification Search .................... 705/35, 705/36, 37
See application file for complete search history.

(56) References Cited

U.S. PATENT DOCUMENTS 4,169,285 A 9/1979 Walker
4,648,038 A 3/1987 Roberts et al.
4,739,478 A 4/1988 Roberts et al.
4,742,457 A 5/1988 Leon et al.
4,752,877 A 6/1988 Roberts et al.
4,933,842 A 6/1990 Durbin et al.
5,121,469 A 6/1992 Richards et al.
5,222,019 A 6/1993 Yoshino et al.
5,257,369 A 10/1993 Skeen et al.
5,270,922 A 12/1993 Higgins
5,297,031 A 3/1994 Gutterman et al.
5,297,032 A 3/1994 Trojan et al.
5,305,200 A 4/1994 Hartheimer et al.
5,381,555 A * 1/1995 Brauns et al. ................ 395/800
5,419,890 A 5/1995 Saidi
5,454,104 A 9/1995 Steidlmayer et al.
5,462,438 A 10/1995 Becker et al.
5,497,317 A 3/1996 Hawkins et al.
5,517,406 A 5/1996 Harris et al.

(Continued)

FOREIGN PATENT DOCUMENTS

WO WO 98/43170 10/1998

(Continued)

OTHER PUBLICATIONS

Form 10-K, United States Securities and Exchange Commission, no date, but for year ending Dec. 31, 2003.*

(Continued)

*Primary Examiner* — F. Ryan Zeender
*Assistant Examiner* — Paul Danneman
(74) *Attorney, Agent, or Firm* — Hunton & Williams LLP

(57) ABSTRACT

A method for providing users with financial reports over a computer network, comprising the steps of: storing respective financial performance data for each of a plurality of securities, each security underlying one of a plurality of structured securities transactions sold by issuers to investors; maintaining an electronic site on the computer network to which the users may connect; receiving search criteria over the computer network from at least one of the users for identifying at least a subset of the financial performance data; retrieving the subset of financial performance data identified by the search criteria, at least some of the subset of financial performance data being arranged in a time series; and providing at least one electronic screen to the at least one user over the computer network, the at least one screen including the subset of financial performance data.

45 Claims, 32 Drawing Sheets

U.S. PATENT DOCUMENTS

| | | | | | |
|---|---|---|---|---|---|
| 5,557,798 | A | | 9/1996 | Skeen et al. | |
| 5,563,783 | A | * | 10/1996 | Stolfo et al. | 705/8 |
| 5,592,379 | A | | 1/1997 | Finfrock et al. | |
| 5,649,186 | A | | 7/1997 | Ferguson | |
| 5,675,746 | A | | 10/1997 | Marshall | |
| 5,706,502 | A | | 1/1998 | Foley et al. | |
| 5,710,889 | A | | 1/1998 | Clark et al. | |
| 5,724,593 | A | | 3/1998 | Hargrave, III et al. | |
| 5,778,157 | A | | 7/1998 | Oatman et al. | |
| 5,787,402 | A | | 7/1998 | Potter et al. | |
| 5,787,403 | A | | 7/1998 | Randle | |
| 5,806,047 | A | | 9/1998 | Hackel et al. | |
| 5,806,048 | A | | 9/1998 | Kiron et al. | |
| 5,819,273 | A | | 10/1998 | Vora et al. | |
| 5,832,461 | A | | 11/1998 | Leon et al. | |
| 5,845,266 | A | | 12/1998 | Lupien et al. | |
| 5,852,811 | A | | 12/1998 | Atkins | |
| 5,864,827 | A | | 1/1999 | Wilson | |
| 5,890,140 | A | | 3/1999 | Clark et al. | |
| 5,913,214 | A | | 6/1999 | Madnick et al. | |
| 5,918,218 | A | | 6/1999 | Harris et al. | |
| 5,922,044 | A | | 7/1999 | Banthia | |
| 5,926,792 | A | | 7/1999 | Koppes et al. | |
| 5,940,810 | A | | 8/1999 | Traub et al. | |
| 5,944,784 | A | | 8/1999 | Simonoff et al. | |
| 5,946,667 | A | | 8/1999 | Tull, Jr. et al. | |
| 5,950,176 | A | | 9/1999 | Keiser et al. | |
| 5,966,531 | A | | 10/1999 | Skeen et al. | |
| 5,966,672 | A | | 10/1999 | Knupp | |
| 5,966,700 | A | | 10/1999 | Gould et al. | |
| 5,970,479 | A | | 10/1999 | Shepherd | |
| 5,986,673 | A | | 11/1999 | Martz | |
| 5,987,434 | A | | 11/1999 | Libman | |
| 5,995,943 | A | | 11/1999 | Bull et al. | |
| 6,006,206 | A | | 12/1999 | Smith et al. | |
| 6,012,042 | A | * | 1/2000 | Black et al. | 705/36 R |
| 6,012,046 | A | | 1/2000 | Lupien et al. | |
| 6,018,714 | A | | 1/2000 | Risen, Jr. | |
| 6,018,721 | A | | 1/2000 | Aziz et al. | |
| 6,023,280 | A | | 2/2000 | Becker et al. | |
| 6,026,381 | A | * | 2/2000 | Barton et al. | 705/36 R |
| 6,029,146 | A | | 2/2000 | Hawkins et al. | |
| 6,029,147 | A | | 2/2000 | Horadan et al. | |
| 6,029,153 | A | | 2/2000 | Bauchner et al. | |
| 6,035,287 | A | | 3/2000 | Stallaert et al. | |
| 6,049,783 | A | | 4/2000 | Segal et al. | |
| 6,052,673 | A | | 4/2000 | Leon et al. | |
| 6,055,522 | A | | 4/2000 | Krishna et al. | |
| 6,058,378 | A | | 5/2000 | Clark et al. | |
| 6,061,662 | A | | 5/2000 | Makivic | |
| 6,064,984 | A | | 5/2000 | Ferguson et al. | |
| 6,070,151 | A | | 5/2000 | Frankel | |
| 6,073,104 | A | | 6/2000 | Field | |
| 6,073,109 | A | | 6/2000 | Flores et al. | |
| 6,073,115 | A | | 6/2000 | Marshall | |
| 6,076,072 | A | | 6/2000 | Libman | |
| 6,078,903 | A | | 6/2000 | Kealhofer | |
| 6,078,914 | A | | 6/2000 | Redfern | |
| 6,078,956 | A | | 6/2000 | Bryant et al. | |
| 6,081,774 | A | | 6/2000 | de Hita et al. | |
| 6,088,685 | A | | 7/2000 | Kiron et al. | |
| 6,088,686 | A | | 7/2000 | Walker et al. | |
| 6,092,056 | A | | 7/2000 | Tull, Jr. et al. | |
| 6,105,005 | A | | 8/2000 | Fuhrer | |
| 6,131,082 | A | | 10/2000 | Hargrave, III et al. | |
| 6,134,600 | A | | 10/2000 | Liu | |
| 6,141,666 | A | | 10/2000 | Tobin | |
| 6,148,298 | A | | 11/2000 | LaStrange et al. | |
| 6,173,270 | B1 | | 1/2001 | Cristofich et al. | |
| 6,173,276 | B1 | | 1/2001 | Kant et al. | |
| 6,178,420 | B1 | | 1/2001 | Sassano | |
| 6,185,567 | B1 | * | 2/2001 | Ratnaraj et al. | 707/10 |
| 6,195,647 | B1 | | 2/2001 | Martyn et al. | |
| 6,226,623 | B1 | | 5/2001 | Schein et al. | |
| 6,233,566 | B1 | * | 5/2001 | Levine et al. | 705/36 R |
| 6,236,972 | B1 | | 5/2001 | Shkedy | |
| 6,236,977 | B1 | | 5/2001 | Verba et al. | |
| 6,243,670 | B1 | | 6/2001 | Bessho et al. | |
| 6,260,021 | B1 | | 7/2001 | Wong et al. | |
| 6,263,321 | B1 | | 7/2001 | Daughtery, III | |
| 6,263,335 | B1 | | 7/2001 | Paik et al. | |
| 6,266,683 | B1 | | 7/2001 | Yehuda et al. | |
| 6,272,474 | B1 | | 8/2001 | Garcia | |
| 6,275,229 | B1 | | 8/2001 | Weiner et al. | |
| 6,278,982 | B1 | | 8/2001 | Korhammer et al. | |
| 6,282,537 | B1 | | 8/2001 | Madnick et al. | |
| 6,285,986 | B1 | | 9/2001 | Andrews | |
| 6,285,989 | B1 | | 9/2001 | Shoham | |
| 6,304,858 | B1 | | 10/2001 | Mosler et al. | |
| 6,313,854 | B1 | | 11/2001 | Gibson | |
| 6,317,726 | B1 | | 11/2001 | O'Shaughnessy | |
| 6,317,728 | B1 | | 11/2001 | Kane | |
| 6,321,212 | B1 | * | 11/2001 | Lange | 705/1 |
| 6,323,881 | B1 | | 11/2001 | Broulik et al. | |
| 6,332,163 | B1 | | 12/2001 | Bowman-Amuah | |
| 6,338,055 | B1 | | 1/2002 | Hagmann et al. | |
| 6,338,068 | B1 | | 1/2002 | Moore et al. | |
| 6,343,287 | B1 | | 1/2002 | Kumar et al. | |
| 6,347,307 | B1 | | 2/2002 | Sandhu et al. | |
| 6,349,290 | B1 | | 2/2002 | Horowitz et al. | |
| 6,349,291 | B1 | | 2/2002 | Varma | |
| 6,356,933 | B2 | | 3/2002 | Mitchell et al. | |
| 6,360,210 | B1 | * | 3/2002 | Wallman | 705/36 |
| 6,366,908 | B1 | | 4/2002 | Chong et al. | |
| 6,381,585 | B1 | | 4/2002 | Maples et al. | |
| 6,381,586 | B1 | | 4/2002 | Glasserman et al. | |
| 6,385,660 | B2 | | 5/2002 | Griesemer et al. | |
| 6,389,413 | B2 | | 5/2002 | Takahashi et al. | |
| 6,389,452 | B1 | | 5/2002 | Glass | |
| 6,401,080 | B1 | | 6/2002 | Bigus et al. | |
| 6,408,282 | B1 | | 6/2002 | Buist | |
| 6,418,417 | B1 | | 7/2002 | Corby et al. | |
| 6,421,653 | B1 | | 7/2002 | May | |
| 6,424,980 | B1 | | 7/2002 | Iizuka et al. | |
| 6,429,868 | B1 | | 8/2002 | Dehner, Jr. et al. | |
| 6,442,545 | B1 | | 8/2002 | Feldman et al. | |
| 6,446,110 | B1 | | 9/2002 | Lection et al. | |
| 6,457,066 | B1 | | 9/2002 | Mein et al. | |
| 6,460,021 | B1 | | 10/2002 | Kirksey | |
| 6,480,882 | B1 | | 11/2002 | McAdam et al. | |
| 6,489,954 | B1 | | 12/2002 | Powlette | |
| 6,490,584 | B2 | | 12/2002 | Barrett et al. | |
| 6,493,681 | B1 | | 12/2002 | Tertitski et al. | |
| 6,510,406 | B1 | | 1/2003 | Marchisio | |
| 6,513,019 | B2 | | 1/2003 | Lewis | |
| 6,516,303 | B1 | | 2/2003 | Wallman | |
| 6,516,308 | B1 | | 2/2003 | Cohen | |
| 6,523,022 | B1 | | 2/2003 | Hobbs | |
| 6,556,987 | B1 | | 4/2003 | Brown et al. | |
| 6,564,250 | B1 | | 5/2003 | Nguyen | |
| 6,581,056 | B1 | | 6/2003 | Rao | |
| 6,581,062 | B1 | | 6/2003 | Draper et al. | |
| 6,598,028 | B1 | | 7/2003 | Sullivan et al. | |
| 6,601,044 | B1 | | 7/2003 | Wallman | |
| 6,611,825 | B1 | | 8/2003 | Billheimer et al. | |
| 6,615,187 | B1 | | 9/2003 | Ashenmil et al. | |
| 6,629,097 | B1 | | 9/2003 | Keith | |
| 6,631,373 | B1 | | 10/2003 | Otani et al. | |
| 6,633,868 | B1 | | 10/2003 | Min et al. | |
| 6,832,209 | B1 | | 12/2004 | Karp et al. | |
| 7,212,993 | B1 | | 5/2007 | Bodurtha et al. | |
| 7,233,921 | B2 | | 6/2007 | Takeda et al. | |
| 2001/0011241 | A1 | | 8/2001 | Nemzow | |
| 2001/0011242 | A1 | | 8/2001 | Allex et al. | |
| 2001/0018674 | A1 | | 8/2001 | Schein et al. | |
| 2001/0020236 | A1 | | 9/2001 | Cannon | |
| 2001/0025264 | A1 | | 9/2001 | Deaddio et al. | |
| 2001/0032217 | A1 | | 10/2001 | Huang | |
| 2001/0042034 | A1 | | 11/2001 | Elliott | |
| 2001/0043235 | A1 | | 11/2001 | Best et al. | |
| 2001/0044771 | A1 | | 11/2001 | Usher et al. | |
| 2001/0056398 | A1 | | 12/2001 | Scheirer | |
| 2002/0002530 | A1 | | 1/2002 | May | |
| 2002/0004777 | A1 | | 1/2002 | Foster et al. | |
| 2002/0007335 | A1 | | 1/2002 | Millard et al. | |
| 2002/0007358 | A1 | | 1/2002 | Johnson et al. | |
| 2002/0010670 | A1 | | 1/2002 | Mosler et al. | |

| | | | |
|---|---|---|---|
| 2002/0013753 | A1 | 1/2002 | Marks de Chabris et al. |
| 2002/0013862 | A1 | 1/2002 | Orchard et al. |
| 2002/0016762 | A1 | 2/2002 | Feilbogen et al. |
| 2002/0016819 | A1 | 2/2002 | Sugimoto et al. |
| 2002/0018077 | A1 | 2/2002 | Powlette |
| 2002/0022956 | A1 | 2/2002 | Ukraninczyk et al. |
| 2002/0023053 | A1 | 2/2002 | Szoc et al. |
| 2002/0026405 | A1 | 2/2002 | Haar |
| 2002/0026449 | A1 | 2/2002 | Azencott |
| 2002/0026462 | A1 | 2/2002 | Shotton, Jr. et al. |
| 2002/0029183 | A1 | 3/2002 | Vlahoplus et al. |
| 2002/0032644 | A1 | 3/2002 | Corby et al. |
| 2002/0035561 | A1 | 3/2002 | Archer et al. |
| 2002/0042767 | A1 | 4/2002 | Kwan |
| 2002/0046158 | A1 | 4/2002 | Kelly et al. |
| 2002/0049666 | A1 | 4/2002 | Reuter et al. |
| 2002/0054115 | A1 | 5/2002 | Mack et al. |
| 2002/0059141 | A1 | 5/2002 | Davies et al. |
| 2002/0065752 | A1 * | 5/2002 | Lewis ............................ 705/35 |
| 2002/0065755 | A1 | 5/2002 | Shlafman et al. |
| 2002/0069157 | A1 | 6/2002 | Jordan |
| 2002/0073007 | A1 | 6/2002 | Ayache |
| 2002/0078253 | A1 | 6/2002 | Szondy et al. |
| 2002/0087373 | A1 | 7/2002 | Dickstein et al. |
| 2002/0087454 | A1 | 7/2002 | Calo et al. |
| 2002/0087455 | A1 | 7/2002 | Tsagarakis et al. |
| 2002/0087457 | A1 | 7/2002 | Madeley et al. |
| 2002/0099646 | A1 | 7/2002 | Agarwal et al. |
| 2002/0099656 | A1 | 7/2002 | Poh Wong |
| 2002/0112056 | A1 | 8/2002 | Baldwin et al. |
| 2002/0123947 | A1 | 9/2002 | Yuste et al. |
| 2002/0130868 | A1 | 9/2002 | Smith |
| 2002/0138390 | A1 | 9/2002 | May |
| 2002/0147671 | A1 | 10/2002 | Sloan et al. |
| 2002/0152154 | A1 | 10/2002 | Rothman et al. |
| 2002/0152156 | A1 | 10/2002 | Tyson-Quah |
| 2002/0156658 | A1 | 10/2002 | Selesny et al. |
| 2002/0161692 | A1 | 10/2002 | Loh et al. |
| 2002/0161853 | A1 | 10/2002 | Burak et al. |
| 2002/0169707 | A1 | 11/2002 | Koek et al. |
| 2002/0174043 | A1 | 11/2002 | Gilbert et al. |
| 2002/0178096 | A1 | 11/2002 | Marshall |
| 2002/0184132 | A1 | 12/2002 | Foster |
| 2002/0184237 | A1 | 12/2002 | McFeely |
| 2002/0194097 | A1 | 12/2002 | Reitz |
| 2002/0194114 | A1 | 12/2002 | Erdmier |
| 2003/0004942 | A1 | 1/2003 | Bird |
| 2003/0009411 | A1 | 1/2003 | Ram et al. |
| 2003/0018558 | A1 | 1/2003 | Heffner et al. |
| 2003/0018714 | A1 | 1/2003 | Mikhailov et al. |
| 2003/0033212 | A1 | 2/2003 | Sandhu et al. |
| 2003/0037174 | A1 | 2/2003 | Lavin et al. |
| 2003/0065594 | A1 | 4/2003 | Murphy |
| 2003/0066025 | A1 | 4/2003 | Garner et al. |
| 2003/0066032 | A1 | 4/2003 | Ramachandran et al. |
| 2003/0078869 | A1 | 4/2003 | Williams |
| 2003/0088496 | A1 | 5/2003 | Piotrowski |
| 2003/0093360 | A1 | 5/2003 | May |
| 2003/0093362 | A1 | 5/2003 | Tupper et al. |
| 2003/0093565 | A1 | 5/2003 | Berger et al. |
| 2003/0105981 | A1 | 6/2003 | Miller et al. |
| 2003/0115122 | A1 | 6/2003 | Slater et al. |
| 2003/0126063 | A1 | 7/2003 | Reuter |
| 2003/0126068 | A1 | 7/2003 | Hauk et al. |
| 2003/0126069 | A1 | 7/2003 | Cha |
| 2003/0126117 | A1 | 7/2003 | Megiddo et al. |
| 2003/0140035 | A1 | 7/2003 | Burrows |
| 2003/0149653 | A1 | 8/2003 | Penney |
| 2003/0154071 | A1 | 8/2003 | Shreve |
| 2003/0158949 | A1 | 8/2003 | Miller et al. |
| 2003/0188255 | A1 | 10/2003 | Shimizu et al. |
| 2003/0220861 | A1 | 11/2003 | Broms et al. |
| 2003/0220868 | A1 | 11/2003 | May |
| 2003/0233459 | A1 | 12/2003 | Miller et al. |
| 2003/0236862 | A1 | 12/2003 | Miller et al. |
| 2003/0236957 | A1 | 12/2003 | Miller et al. |
| 2004/0064397 | A1 | 4/2004 | Lynn et al. |
| 2004/0078248 | A1 | 4/2004 | Altschuler |
| 2004/0103003 | A1 | 5/2004 | Mayers et al. |
| 2004/0148247 | A1 | 7/2004 | Miller et al. |
| 2004/0162775 | A1 | 8/2004 | Winklevoss et al. |
| 2004/0167850 | A1 | 8/2004 | Dreyer et al. |
| 2004/0220885 | A1 | 11/2004 | Salzmann et al. |
| 2004/0225596 | A1 | 11/2004 | Kemper et al. |
| 2005/0060256 | A1 | 3/2005 | Peterson et al. |
| 2005/0086170 | A1 | 4/2005 | Rao |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Levine et al., provisional application for patent 6,233,566, Dec. 31, 1998.*

Manco et al., A Framework for Adaptive Mail Classification, 14th IEEE Conference on Tools with Artificial Intelligence (ICTAI'02), Nov. 4, 2002, p. 387.

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.

Block Trades Market Practice, Apr. 1, 2003, pp. 1-10.

Chacko, Cephalon, Inc. Taking Risk Management Gherory Seriously.

Kus, Contingent capital: just in the capital management sets a new standard; Sponsored statement.

Electronic Trading Tools.

Martin, Email Report, Issue 11, Aug. 16, 2001, printed Aug. 2, 2005, NeoVision Heatmaps ssctech.com.

Fast Email Extractor 4.4.

PILA, in Case of Emergency; contingent capital, Dec. 1, 200.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali et al., Phrase-based Text Representation for Managing the Web Documents.

Lam et al., Querying Web Data—The WebQA Approach.

Rising to the challenge of global STP, Euromoney Publications PLC Global Inventor, Nov. 1, 1999, pp. 51-52; ISSN. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo et al., Structuring the Web.

Witten et al., Text Mining: A New Frontier for Lossless Compression.

Emery, et al., The Measurement of Liquidity, Journal of Accounting Research, vol. 20, No. 2, Part 1, p. 290-303, Autumn 1982, Credit Evals , Liquidity Ratios.

Calado, The Web-DL Environment for Building Digital Libraries from the Web.

Ribiero-Neto et al., Top Down Extraction of Semi-Structured Data, String Processing and Information Retrieval Symposium & amp.
Roberts, Top Priority on Bottom Line: More Companies Seeting to Manage Business Risks.
TradeWeb's STP vision, Euromoney Institutional Investor PLC, Sec. 406, vol. 34, Feb. 1, 2003, p. S6; ISSN: 0014-2433.
Elkayam, Using Indexed Bonds.
Myllymaki, With Standard XML Technologies.
Hewlett-Packard, x4queview.org.
Friis, Williams, Friis, Goodbye to Paper?, American Bankers Association, ABA Banking Journal, New York, Mar. 1989, vol. 81, Iss. 3 (5 pages).
Financial Accounting Standards Board, Financial Accounting Standards Board (FASB), FASB Interpretation No. 41, Dec. 1994.
Ghco.com, Electronic Trading Tools (http://www.ghco.com/customer__services/trading__platforms.asp) (date unknown).
Kane, Edward, Kane, Market Incompleteness and Divergences Between Forward and Futures Interest Rates, The Journal of Finance, vol. 35, No. 2, Papers and Proceedings Thirty-Eighth Annual Meeting American Finance Association, Atlanta, Georgia, Dec. 28-30, 1979 (May.
Markman, Jon D., Markman, (Feb. 11, 1997), Wall Street, California, How About a Convertible Preferred?; Hybrid Can Offer a Stock's Growth but With Less Risk: Home Edition. Los Angeles Times, p. D, 5:1. Retrieved May 21, 2010 from Los Angeles Times (Document ID: 110385.
Mizushima, Hiromasa, Mizushima, The Nikko Securities Co., Ltd., Fixprotocol, Financial Information Exchange-FIX General Conference, Tokyo, Oct. 7, 1998.

* cited by examiner

CHASE

Chase Home | Site Directory | Contact Us | Privacy Policy | Terms & Conditions

| Personal | Small Business | Corporate & Institutional | About Chase |

28 July 1999

Structured Finance Investor Reporting
Sign Me Up

▽ Trust and Related Services
Structured Finance
Investor Reporting
△ Sign On
△ Sign Up
△ Trustee Reporting
△ Performance Analytics
△ FAQs Please select a unique user name and password. 61
All fields marked with an * are required fields.

60 →

*Name
*Company
Department
*Street
*City
*State/Province
*Zip
*Country
*Phone Number
Fax Number
Email Address
*Business Type 107 →  FAQs

*User ID
*Password
(Minimum of 5 characters)
*Retype Password
*Password Hint Question
(e.g. "What is your mother's maiden name?")
*Password Hint Answer
(e.g. "Jones")
Comments

[ Clear ] [ Submit ]

Trust and Related Services
Structured Finance
Investor Reporting
Trustee Reporting | Performance Analytics Personal | Small Business |
Corporate & Institutional | About Chase

⊕CHASE   THE RIGHT RELATIONSHIP IS EVERYTHING.®

Back to Top

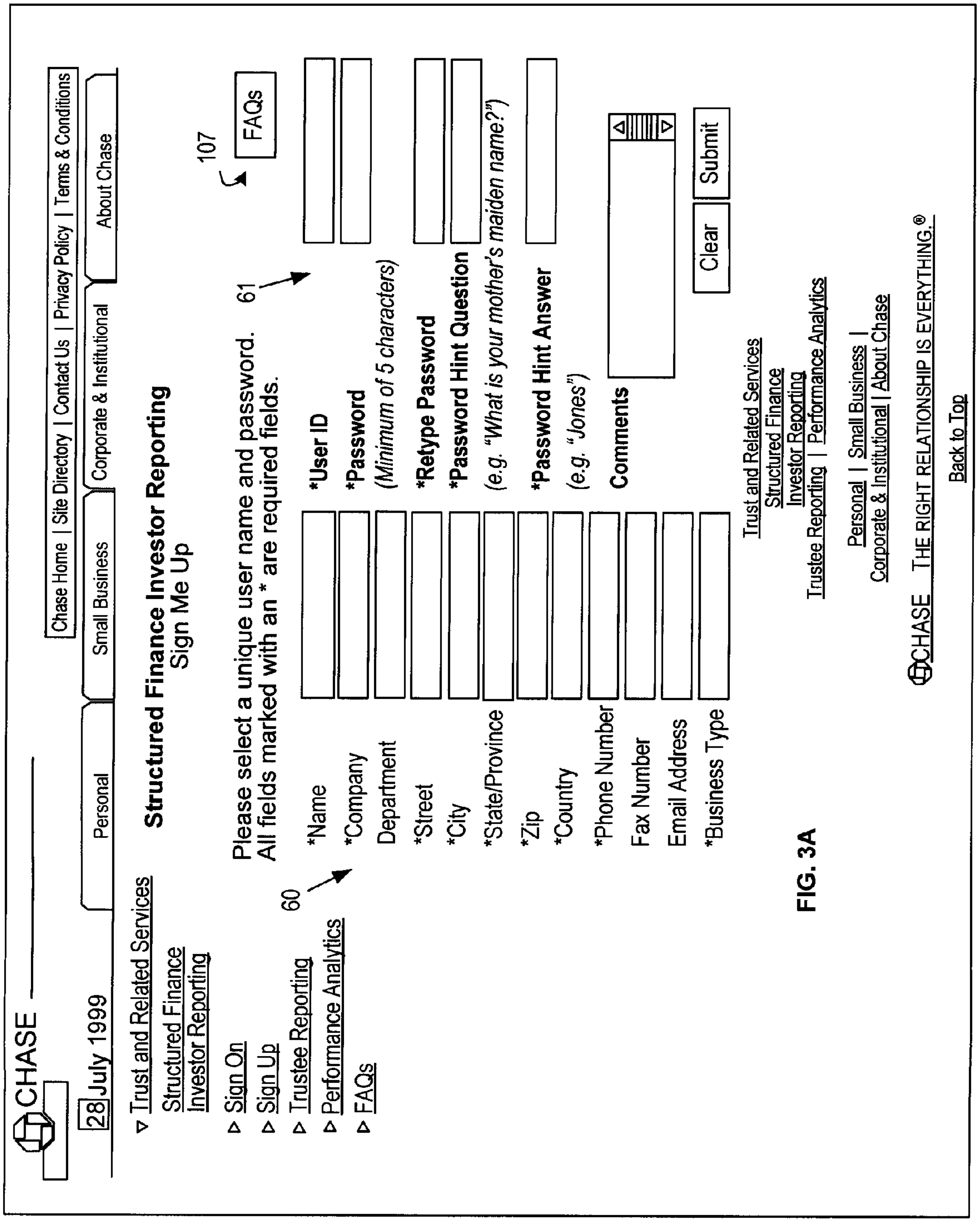

FIG. 3A

*Chase Consulting Associates*

Transaction Performance Analytics

Frequently Asked Questions (FAQs)

1) How do I download Data?

Go to the report that has the data you are interested in. At the bottom of the report will be a spreadsheet icon(s) containing the data used to generate the table and graphs in that report. Doubleclick on the spreadsheet with the data that you want.

2) Who maintains this site? Who can I call with questions?

This is site is developed and maintained by Chase Consulting Associates, a unit of The Chase Manhattan Bank. Call Jay Merves (212-946-3459) or Michael London (212-946-7589).

3) How do I return to the page with the list of reports once I have already clicked to view a particular report?

Use the Back Button on your browser to return to the page with the list of reports related to a particular transaction.

4) Where does the source data come from for the information provided on this site.

All data is provided to Chase Consulting Associates by the issuer/servicer.

FIG. 3C

CHASE

28 July 1999 | Personal | Small Business | Corporate & Institutional | About Chase Chase Home | Site Directory | Contact Us | Privacy Policy | Terms & Conditions

Structured Finance Investor Reporting
| Forgot My Password

▽ Trust and Related Services
  Structured Finance
  Investor Reporting
△ Sign On
△ Sign Up
△ Trustee Reporting
△ Performance Analytics
△ FAQs <User ID>, here is the password hint question you've provided

*What is your mother's maiden name?*

Answer [_____] ← 66

[Submit]

FAQs ← 107

Trust and Related Services
Structured Finance
Investor Reporting
Trustee Reporting | Performance Analytics Personal | Small Business |
Corporate & Institutional | About Chase

⊕CHASE  THE RIGHT RELATIONSHIP IS EVERYTHING.®

Back to Top

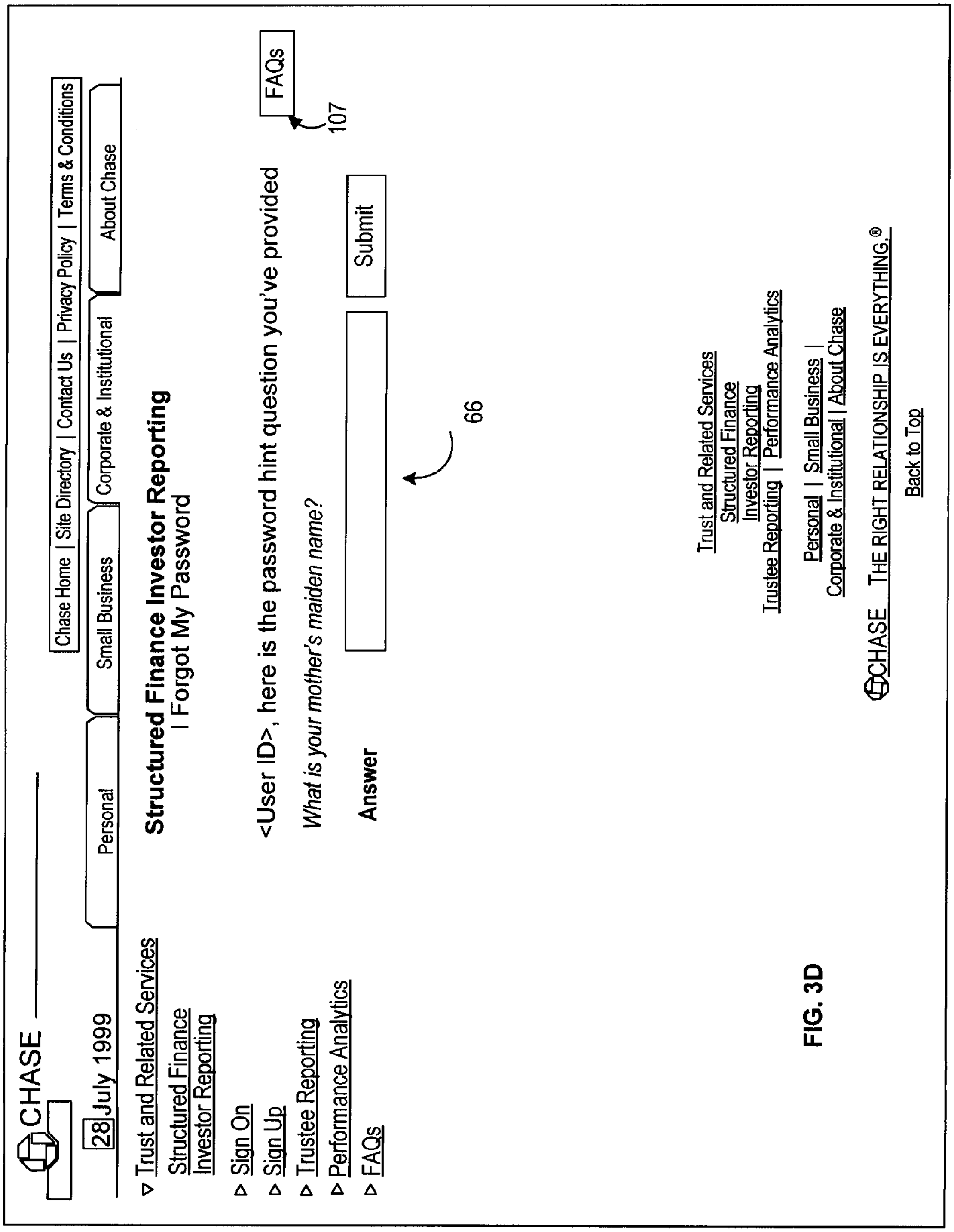

FIG. 3D

CHASE

28 July 1999

Chase Home | Site Directory | Contact Us | Privacy Policy | Terms & Conditions

| Personal | Small Business | Corporate & Institutional | About Chase |

▽ Trust and Related Services
▷ Structured Finance Investor Reporting
▷ Trustee Reporting
   My Portfolio
   △ Advanced Search
△ Performance Analytics
△ FAQs
△ Modify My Profile
△ Change My Password

Structured Finance Investor Reporting

Create My Trustee Reporting Portfolio

To access reports more quickly and easily each time you visit, you can build a personal portfolio. Search for issues below, and add to your portfolio from the "Select Report" page.

FAQs

1. Select One or More of the Following:
- ☐ ABS ← 101
- ☐ CMBS ← 105
- ☐ MBS ← 103

2. Enter Keyword(s):
[_____] ← 109

[ Clear ] [ Submit ]

OR

2. Search for Deals Alphabetically ← 71
- ☐ A-F    ☐ O-T
- ☐ G-N    ☐ U-Z

Trust and Related Services
Structured Finance
Investor Reporting
Trustee Reporting | Performance Analytics Personal | Small Business |
Corporate & Institutional | About Chase

⊕CHASE THE RIGHT RELATIONSHIP IS EVERYTHING.®

Back to Top

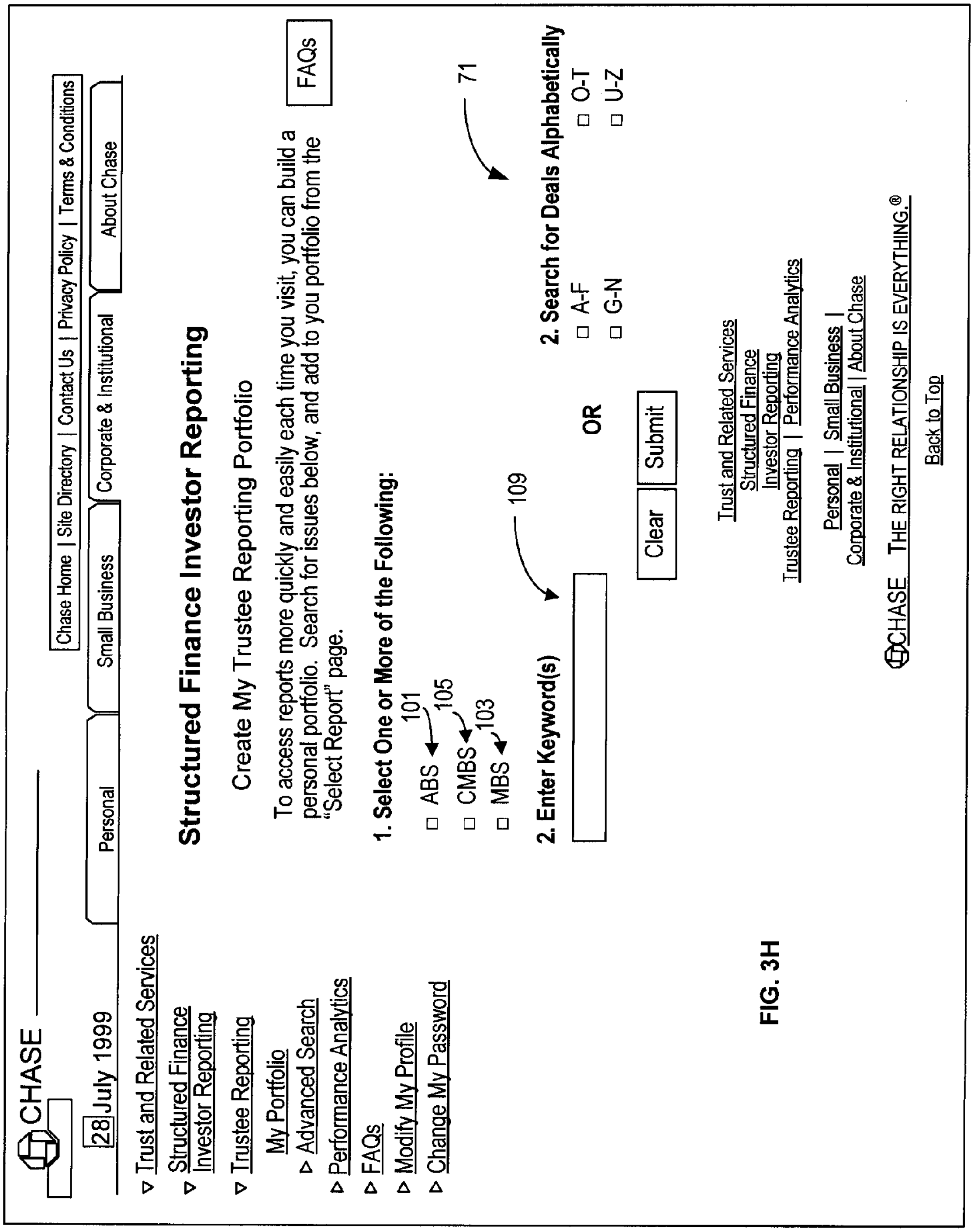

FIG. 3H

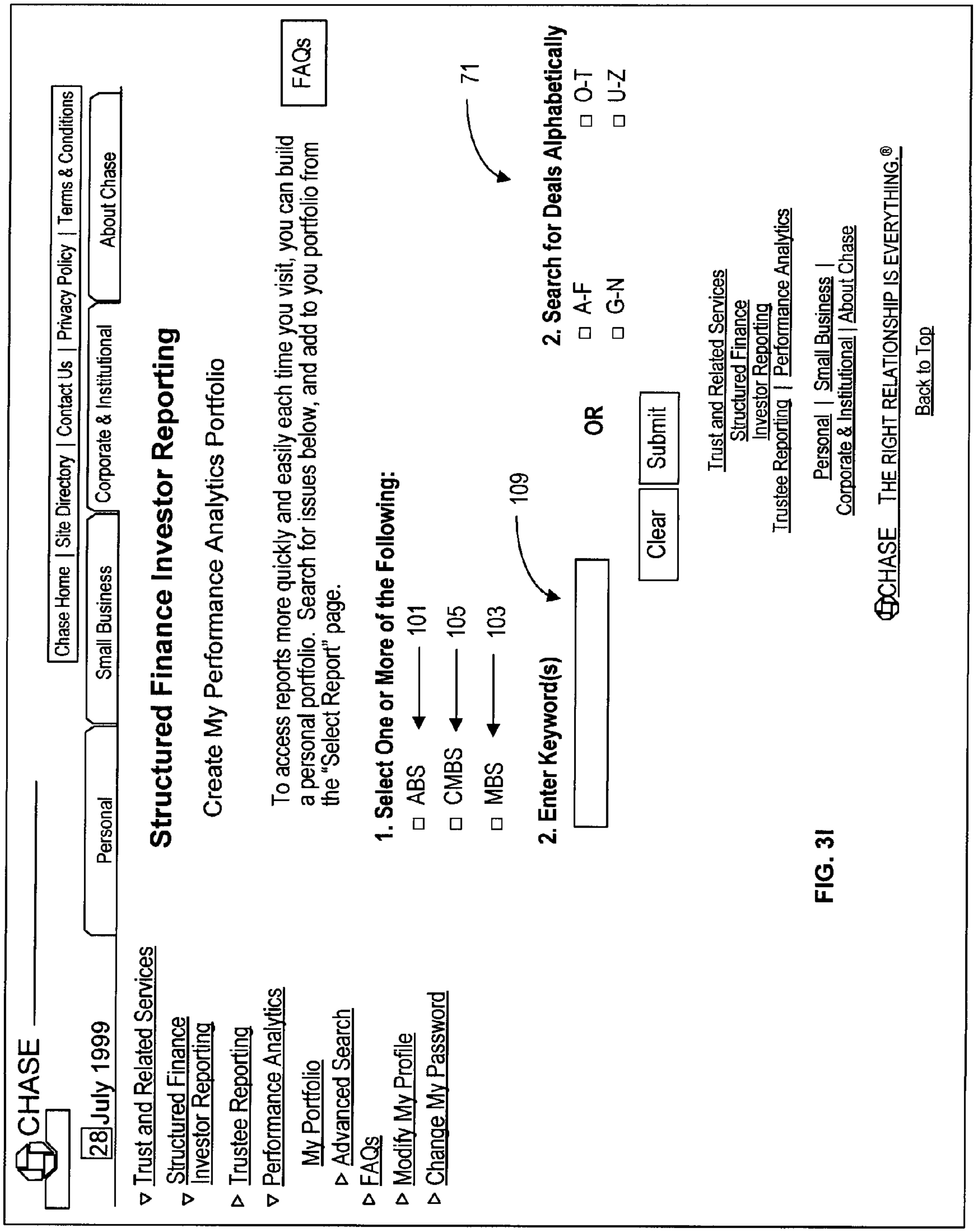

FIG. 3I

CHASE

28 July 1999

| Personal | Small Business | Corporate & Institutional |

Chase Home | Site Directory | Contact Us | Privacy Policy | Terms & Conditions

About Chase

▷ Trust and Related Services
▷ Structured Finance
  Investor Reporting
▷ Trustee Reporting
▷ Performance Analytics
  My Portfolio
  ▷ Advanced Search
▷ FAQs
▷ Modify My Profile
▷ Change My Password

Structured Finance Investor Reporting

Create My Performance Analytics Portfolio

To access reports more quickly and easily each time you visit, you can build a personal portfolio. Search for issues below, and add to you portfolio from the "Select Report" page.

1. Select One or More of the Following:
☐ ABS — 101
☐ CMBS — 105
☐ MBS — 103

2. Enter Keyword(s) — 109

[         ]

FAQs

2. Search for Deals Alphabetically — 71
☐ A-F    ☐ O-T
☐ G-N    ☐ U-Z

OR

[ Clear ] [ Submit ]

Trust and Related Services
Structured Finance
Investor Reporting
Trustee Reporting | Performance Analytics Personal | Small Business |
Corporate & Institutional | About Chase

♦CHASE  THE RIGHT RELATIONSHIP IS EVERYTHING.®

Back to Top

CHASE

28 July 1999

- Trust and Related Services
- Structured Finance
  Investor Reporting
- Trustee Reporting
- Performance Analytics
  - My Portfolio
    Advanced Search
  - FAQs
  - Modify My Profile
  - Change My Password Chase Home | Site Directory | Contact Us | Privacy Policy | Terms & Conditions

| Personal | Small Business | Corporate & Institutional | About Chase |

Structured Finance Investor Reporting

Performance Analytics Search Results

FAQs

Please select a deal name to view available reports. Deals marked with a [P] are already in your portfolio. To add deals to your portfolio, select each deal and click "Add to My Portfolio"

Asset Class Legend:
- □ ABS
- ○ CMBS
- △ MBS

| Add To My Portfolio | Asset Class | Deal Name |
|---|---|---|
| □ | □ | Listing. This is a full listing for the deal. |
| [P] | ○ | Listing. This is a full listing for the deal. |
| □ | △ | Listing. This is a full listing for the deal. |
| □ | □ | Listing. This is a full listing for the deal. |
| [P] | ○ | Listing. This is a full listing for the deal. |
| [P] | | Listing. This is a full listing for the deal. |

▲ Next page of results

Trust and Related Services
Structured Finance
Investor Reporting
Trustee Reporting | Performance Analytics Personal | Small Business |
Corporate & Institutional | About Chase

CHASE   THE RIGHT RELATIONSHIP IS EVERYTHING.®

Back to Top

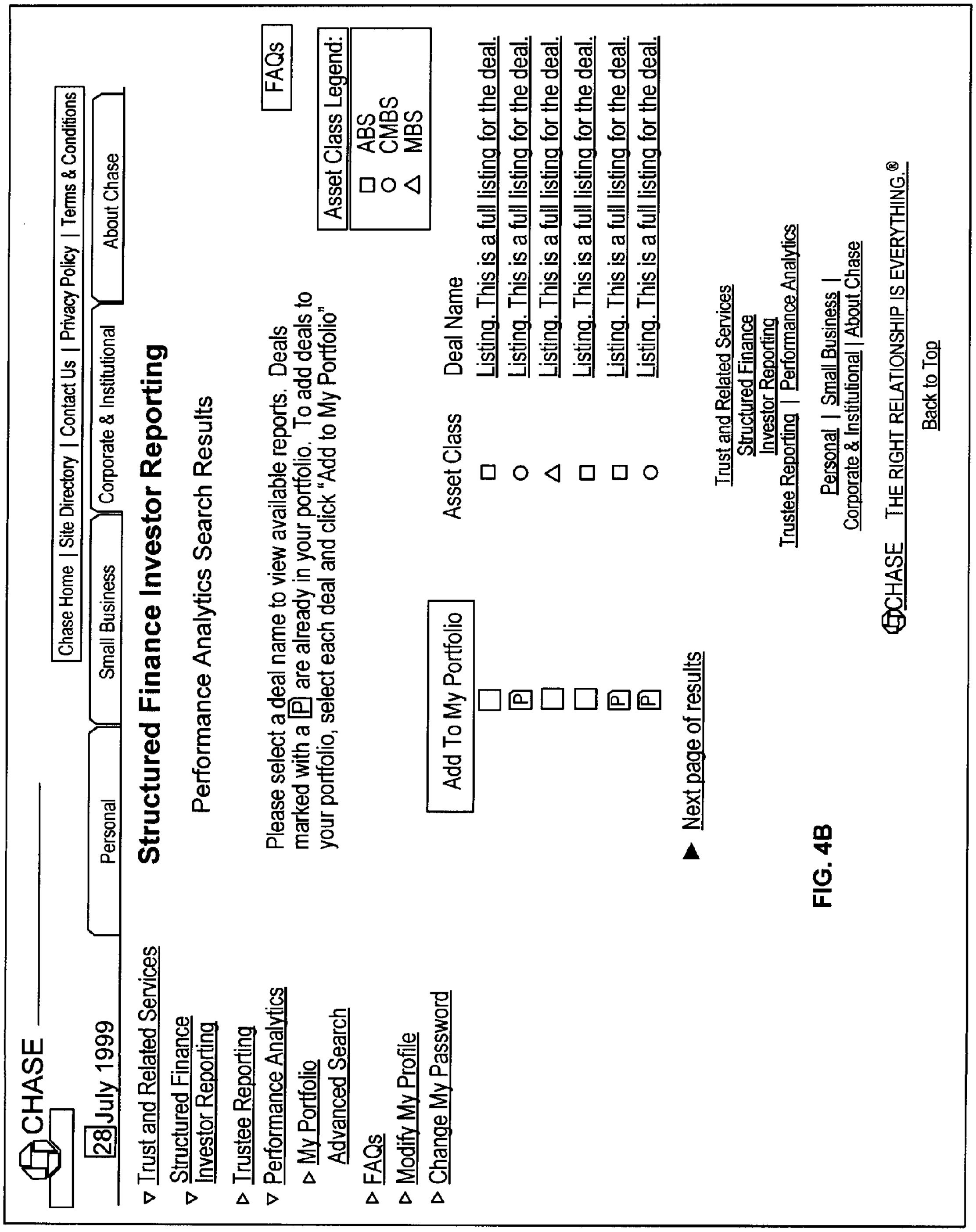

FIG. 4B

*Chase Consulting Associates*
Transaction Performance Analytics
AGGREGATE PORTFOLIO PERFORMANCE DATA
Money Shoppe
PREPAYMENT ANALYSIS
Effect of Credit Grade on Prepayments
119
Fixed Rate Loans | A Loans ______ C Loans ______
1995 Loans 113
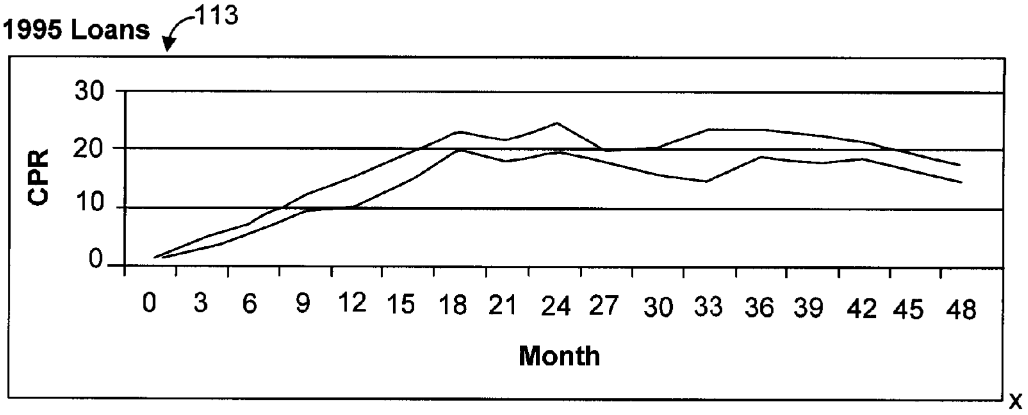
1996 Loans 115
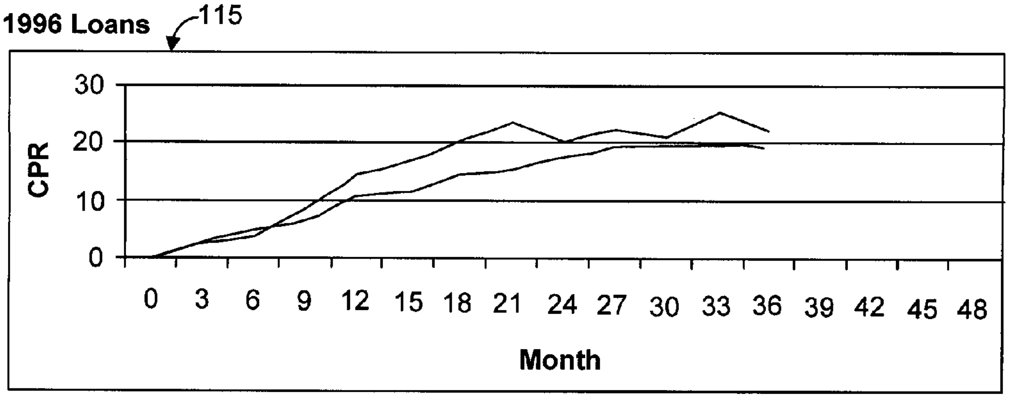
FIG. 6A

1997 Loans
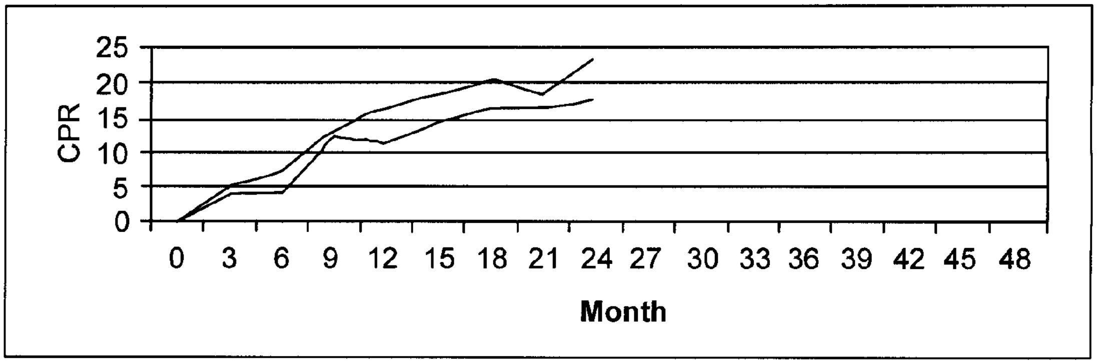
File Downloads
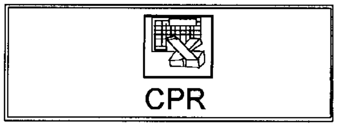
FIG. 6C

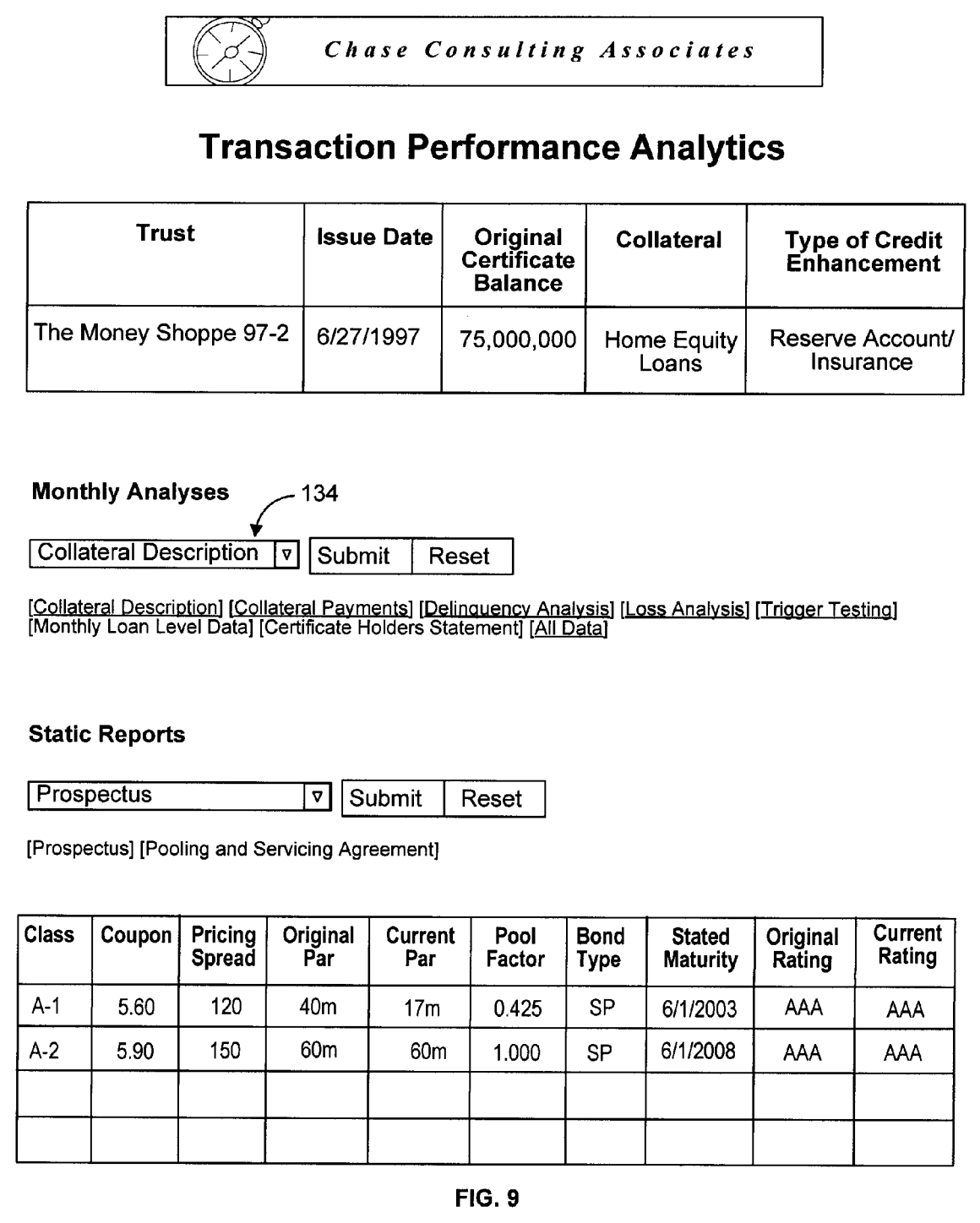

*Chase Consulting Associates*

Transaction Performance Analytics

| Trust | Issue Date | Original Certificate Balance | Collateral | Type of Credit Enhancement |
|---|---|---|---|---|
| The Money Shoppe 97-2 | 6/27/1997 | 75,000,000 | Home Equity Loans | Reserve Account/ Insurance |

Monthly Analyses 134

Collateral Description ▿ | Submit | Reset

[Collateral Description] [Collateral Payments] [Delinquency Analysis] [Loss Analysis] [Trigger Testing] [Monthly Loan Level Data] [Certificate Holders Statement] [All Data]

Static Reports

Prospectus ▿ | Submit | Reset

[Prospectus] [Pooling and Servicing Agreement]

| Class | Coupon | Pricing Spread | Original Par | Current Par | Pool Factor | Bond Type | Stated Maturity | Original Rating | Current Rating |
|---|---|---|---|---|---|---|---|---|---|
| A-1 | 5.60 | 120 | 40m | 17m | 0.425 | SP | 6/1/2003 | AAA | AAA |
| A-2 | 5.90 | 150 | 60m | 60m | 1.000 | SP | 6/1/2008 | AAA | AAA |
| | | | | | | | | | |
| | | | | | | | | | |

FIG. 9

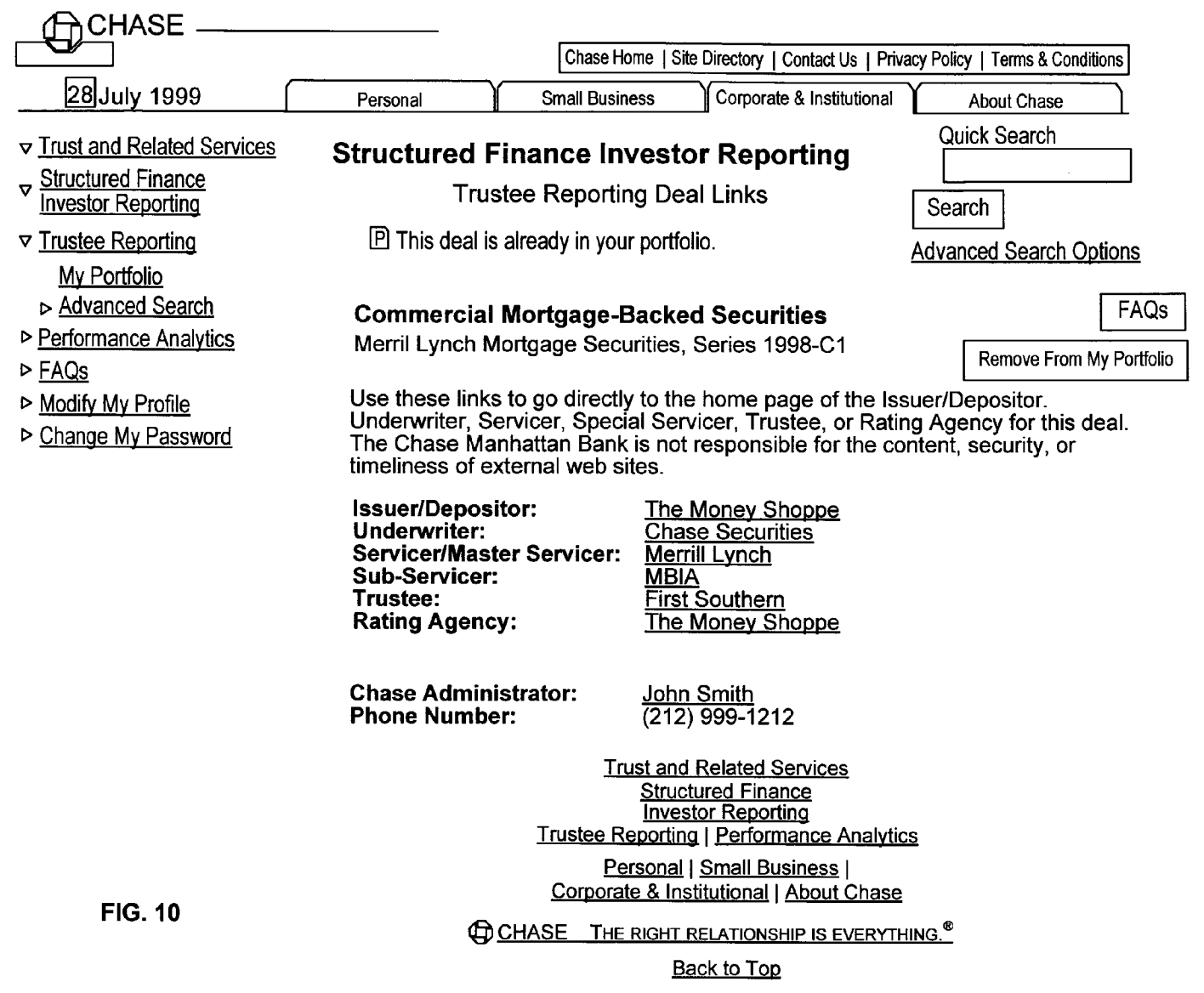

CHASE

Chase Home | Site Directory | Contact Us | Privacy Policy | Terms & Conditions

28 July 1999

Personal | Small Business | Corporate & Institutional | About Chase

- Trust and Related Services
- Structured Finance Investor Reporting
- Trustee Reporting
  - My Portfolio
  - Advanced Search
- Performance Analytics
- FAQs
- Modify My Profile
- Change My Password

Structured Finance Investor Reporting

Trustee Reporting Deal Links

P This deal is already in your portfolio.

Quick Search

Search

Advanced Search Options

FAQs

Remove From My Portfolio

Commercial Mortgage-Backed Securities

Merril Lynch Mortgage Securities, Series 1998-C1

Use these links to go directly to the home page of the Issuer/Depositor. Underwriter, Servicer, Special Servicer, Trustee, or Rating Agency for this deal. The Chase Manhattan Bank is not responsible for the content, security, or timeliness of external web sites.

| | |
|---|---|
| **Issuer/Depositor:** | The Money Shoppe |
| **Underwriter:** | Chase Securities |
| **Servicer/Master Servicer:** | Merrill Lynch |
| **Sub-Servicer:** | MBIA |
| **Trustee:** | First Southern |
| **Rating Agency:** | The Money Shoppe |

| | |
|---|---|
| **Chase Administrator:** | John Smith |
| **Phone Number:** | (212) 999-1212 |

Trust and Related Services
Structured Finance
Investor Reporting
Trustee Reporting | Performance Analytics Personal | Small Business |
Corporate & Institutional | About Chase

CHASE THE RIGHT RELATIONSHIP IS EVERYTHING.®

Back to Top

FIG. 10

CHASE

Chase Home | Site Directory | Contact Us | Privacy Policy | Terms & Conditions

28 July 1999

Personal | Small Business | Corporate & Institutional | About Chase

▽ Trust and Related Services
▽ Structured Finance Investor Reporting
▷ Trustee Reporting
▽ Performance Analytics
My Portfolio
▷ Advanced Search
▷ FAQs
▷ Modify My Profile
▷ Change My Password Quick Search Search Advanced Search Options FAQs Remove From My Portfolio

Structured Finance Investor Reporting

Performance Analytics Deal Links

P This deal is already in your portfolio

Commercial Mortgage-Backed Securities

Merril Lynch Mortgage Securities, Series 1998-C1

Use these links to go directly to the home page of the Issuer/Depositor. Underwriter, Servicer, Special Servicer, Trustee, or Rating Agency for this deal. The Chase Manhattan Bank is not responsible for the content, security, or timeliness of external web sites.

| | | |
|---|---|---|
| **Issuer/Depositor** | The Money Shoppe<br>555 Mockingbird Lane<br>Scarsdale, NY 10247<br>(914) 555-2121 | Contact:<br>Bob Jones, Investor Relations<br>bjones@moneyshoppe.com |
| **Underwriter** | Chase Securities<br>270 Park Avenue, 44th Floor<br>New York, NY 10010<br>(212) 746-9893 | Contact:<br>Jeff Roads, ABS<br>jroads@chase.com |
| **Co-Underwriter** | Merrill Lynch<br>World Financial Center<br>North Tower<br>New York, NY 10281<br>(212) 499-0033 | Contact:<br>Vito DeMarco, ABS<br>vdemarco@ml.com |
| **Bond Insurer** | MBIA<br>111 King Street<br>Armonk, NY 23456<br>(800) 123-4567 | Contact:<br>Ellen McDonald<br>emcdonald@mbia.com |
| **Master Servicer** | First Southern<br>121 Broadway, 45th Floor<br>New York, NY 10001<br>(212) 123-4567 | Contact:<br>Patrick O'Hanlon<br>pohanlon@fs.com |
| **Servicer** | The Money Shoppe<br>555 Mockingbird Lane<br>Scarsdale, NY 10247<br>(914) 555-2121 | Contact:<br>Joe Little, Servicing<br>joelittle@moneyshoppe.com |
| **Trustee** | California Trust<br>321 Smithville Road<br>Torrence, CA 94120<br>(213) 546-8899 | Contact<br>Will Nevins<br>wnevins@caltrust.com |

Trust and Related Services
Structured Finance
Investor Reporting
Trustee Reporting | Performance Analytics Personal | Small Business |
Corporate & Institutional | About Chase

CHASE THE RIGHT RELATIONSHIP IS EVERYTHING.®

Back to Top

FIG. 11

*Chase Consulting Associates*

Transaction Performance Analytics

COLLATERAL DESCRIPTION

| Collateral Balances (millions) | | |
|---|---|---|
| | Original | Current |
| Group I | $30.0 | $18.0 |
| Group II | $70.0 | $56.3 |

Collateral Breakout

| LTV* | (millions) | |
|---|---|---|
| 0-70% | $20 | 40% |
| 70-80% | $20 | 40% |
| 80-90% | $5 | 10% |
| 90+% | $5 | 10% |

*Remaining Balance/Original Value

Group Definitions

Loan Group I

As of the Statistical Calculation Date, the average Loan Balance of Loan Group I was $79,312.24; the Coupon Rates of such Home Equity Loans ranged from 6.99% to 17.99%; the weighted average Loan-to-Value Ratio of Loan Group I was 79.37%; the weighted average Combined Loan-to-Value Ratio of Loan Group I was 79.63%; the weighted average Coupon Rate of Loan Group I was 10.01%; the weighted average remaining term to maturity of Loan Group I was 357.34 months; and the weighted average original term to maturity of Loan Group I was 358.70 months. The remaining terms to maturity as of the Statistical Calculation Date of Loan Group I ranged from 240 months to 360 months. The minimum and maximum Loan Balances of Loan Group I as of the Statistical Calculation Date were $7,320.68 and $283,685.26 respectively. No Home Equity Loans in Loan Group I will mature later than September 5, 2028. 7,531 of the Home Equity Loans in Loan Group I are secured by first mortgages representing 99.49% of the Loan Balance of the Home Equity Loans in Loan Group I and 83 of the Home Equity Loans in Loan Group I are secured by second lien mortgages representing in the aggregate 0.51% of the Loan Balance of Loan Group I Loans.

FIG. 12A

Loan Group II

As of the Statistical Calculation Date, the average Loan Balance of the Home Equity Loans in Loan Group IIa was $99,116.56; the Coupon Rates of Home Equity Loans in Loan Group IIa ranged from 7.25% to 16.00%; the weighted average Loan-to-Value Ratio of Loan Group IIa was 80.91%; the weighted average Coupon Rate of the Home Equity Loans in Loan Group IIa was 10.69%; the weighted average remaining term to maturity of the Home Equity Loans in Loan Group IIa 358.57 months; and the weighted average original term to maturity of the Home Equity Loans in Loan Group IIa 359.93 months. The Statistical Calculation Date were ranged from 179 months to 360 months. The minimum and maximum Loan Balances of the Home Equity Loans in Loan Group Iia as of the Statistical Calculation Date were $9,988.75 and $424,500.00, respectively. None of the Home Equity Loans in Loan Group IIa contain "balloon" payments. No Home Equity Loan in Loan Group IIa will mature later than September 1, 2028. All of the Home Equity Loans in Loan Group IIa are secured by first mortgages.

FIG. 12B

Transaction Performance Analytics
Money Shoppe 97-2: Collateral Prepayments
136
| Prepayments (%CPR) | | | | | |
|---|---|---|---|---|---|
| | Projection At Time of Issue | One-Month | 3-month | 6-month | Life |
| <u>Group I</u> | 22.0 | 18.6 | 19.4 | 16.2 | 15.5 |
| <u>Group II</u> | 29.0 | 26.1 | 25.2 | 22.0 | 21.1 |
| | | | | | |
PREPAYMENT GRAPHS
138
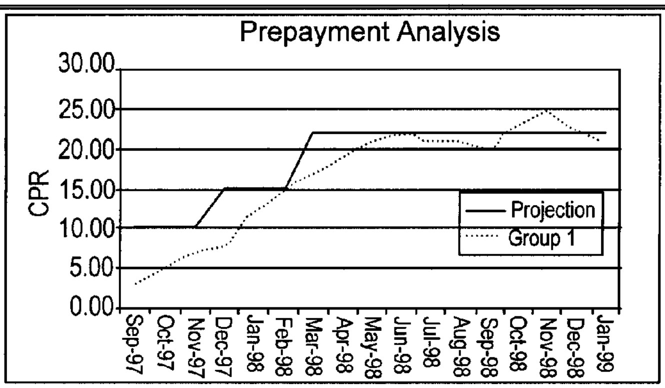
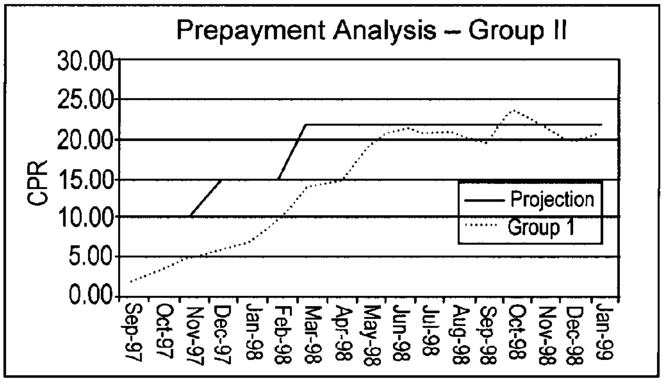
File Downloads
97-2 CPR
FIG. 13

Transaction Performance Analytics
Money Shoppe 97-2: Delinquency Analysis
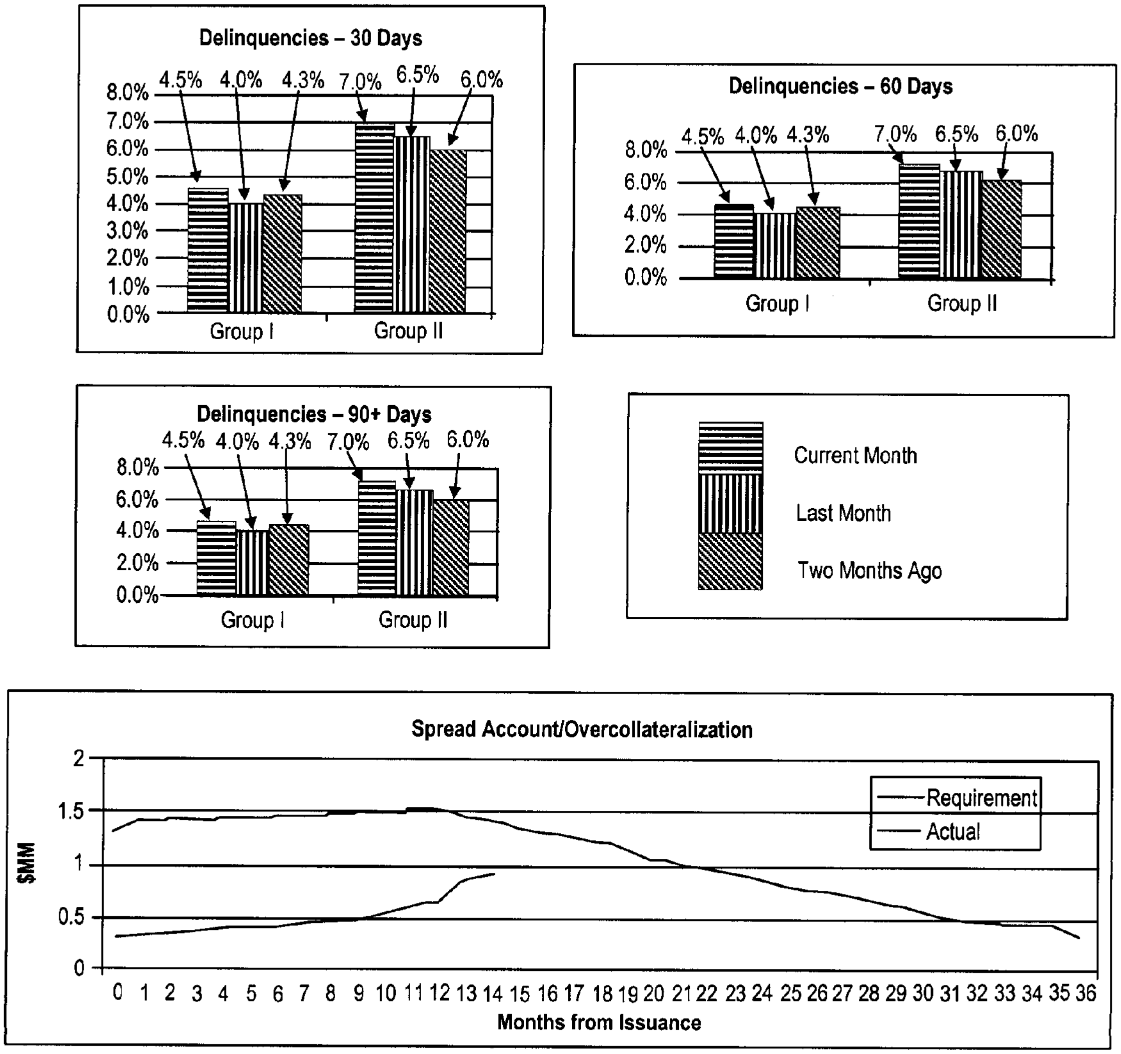
File Downloads
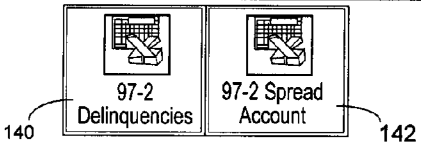
FIG. 14

Transaction Performance Analytics

Money Shoppe 97-2: Loss Analysis

144

| **Loans in Foreclosure** (Included in Delinquencies) | Number | Principal Balance | % |
|---|---|---|---|
| Group I | 1 | $160,000 | 1.1% |
| Group II | 1 | $110,000 | 0.9% |

146

| **Loans in Bankruptcy** (Included in Delinquencies) | Number | Principal Balance | % |
|---|---|---|---|
| Group I | 3 | $180,000 | 1.1% |
| Group II | 1 | $110,000 | 0.9% |

148

| **REO Properties** (NOT Included in Delinquencies) | Number | Principal Balance | % |
|---|---|---|---|
| Group I | 1 | $155,000 | 0.8% |
| Group II | 1 | $110,000 | 0.9% |

150

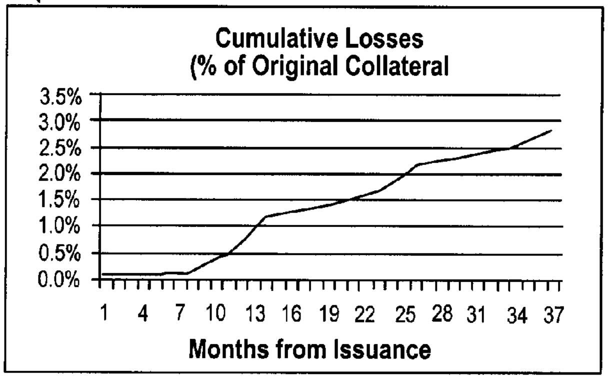

152

| **Losses** | |
|---|---|
| Current Month | $52,631 |
| Last Month | $27,243 |
| Losses-to-Date | $1,246,444 |

File Downloads

154

97-2 Losses

FIG. 15

STRUCTURED FINANCE PERFORMANCE ANALYTICS SYSTEM

CROSS-REFERENCE TO RELATED APPLICATION

This application is based on and claims priority to U.S. Provisional Patent Application No. 60/134,470, filed May 17, 1999, entitled STRUCTURED FINANCE PERFORMANCE ANALYTICS SYSTEM, the entire disclosure of which is hereby incorporated by reference.

BACKGROUND OF THE INVENTION

1. Field of the Invention

The present invention relates to a system and method for providing an issuing party of a structured securities transaction with a vehicle by which performance data of one or more underlying assets of the transaction may be communicated to one or more investors, potential investors, or other interested parties.

2. Related Art

The selling and buying parties to a structured securities transaction (or deal as is known in the art) are the issuer (or originator) and one or more investors. There are many types of securities which may be issued in a structured transaction, such as asset-backed securities, mortgage-backed securities, etc.

In an asset-backed security transaction, the issuer sells one or more corporate obligations (often in the form of a fixed income security) which are securitized by a pool of assets. The one or more investors purchase the corporate debt obligation(s) with the understanding that the underlying pool of assets (such as accounts receivable, loans, etc.) affect their income from the security.

In mortgage-backed securities transactions, the corporate debt obligations are secured by a pool of mortgages.

Issuers of structured financial securities are those entities who generate financial assets in the normal course of their business. Such issuers include, but are not limited to, banks, thrifts, mortgage companies, manufacturers and distributors with a financing division, retailers with credit card or other finance operations, consumer finance companies, specialty finance companies, equipment lessors, asset aggregators, or any other business enterprise that generates substantial quantities of trade receivables.

Investors include, but are not limited to, insurance companies, banks, thrifts, mutual funds, and private investors. Other interested parties include rating agencies, monoline insurers, research firms, investment banks, and accounting firms.

A structured security transaction is structured in accordance with one or more documents, such as a Pooling and Servicing Agreement, a primary document that governs the transaction, including the roles of a trustee, service provider (known as a "servicer"), and bond issuer. The trustee is hired by the issuer to represent the investors and, in the structured finance context, is typically one out of four or five large financial institutions (e.g., Chase Manhattan Bank). The servicer is often the issuer or originator of the asset, but sometimes is a third party.

Investors are often interested in the performance of the underlying assets securitizing the corporate debt obligations because it could affect the timing and amount of income received on the security or the ability to be repaid the principal of the security. The Pooling and Servicing Agreement will typically provide that the trustee and/or servicer prepare periodic monthly reports concerning the status of the underlying pools of assets. For example, when a pool of assets comprises a number of loans which underlie a security, the trustee, servicer, or other party may be bound to provide status to the investors on the underlying loans. The status may include, for example, principal collected, interest collected, foreclosures, prepayments, losses, delinquencies, whether trigger thresholds have been reached, etc.

The reports on the status of the underlying assets are typically prepared on a monthly basis and transmitted to the investors via, for example, facsimile transmission or may be posted on an electronic billboard (such as on the internet).

Unfortunately, these conventional reports prepared by the trustee and/or servicer in accordance with the Pooling and Services Agreement, have several disadvantages. In particular, these reports provide status on the underlying assets for only one point in time (i.e., during the relevant month). Thus, the investor is not provided with historical information on the performance of the underlying assets, for example, a time series of interest collected on the loan assets. Indeed, the static "snap shot" of data provided in these reports does not provide the investors with information as to performance trends of the underlying assets which may be utilized by the inventors, for example, to determine whether the security should be held or sold.

Another disadvantage is that the conventional reports are only available to the investors who are parties to the deal. A potential investor (i.e., an investor who has not yet purchased an asset-backed or mortgage-backed security from the issuer) cannot readily obtain the reports from the trustee and/or service provider. Thus, the issuer cannot easily use the performance data relating to past deals to persuade a potential investor to purchase securities in a new deal.

Further, each report provided by the trustee and/or servicer relates to only one deal. It is not possible, therefore, for these reports to provide information as to the performance of a portfolio of underlying assets from more than one deal. For example, if an investor were interested in the asset performance of all assets originated by issuer X in the same year, then those assets would likely securitize obligations related to more than one deal. The conventional reports, therefore, would not provide the investor with the information he desires.

Another disadvantage of the conventional reports provided by the trustee and/or servicer is that they contain only that information which is scripted by the indenture document (i.e., the Pooling and Servicing Agreement). Thus, the issuer is not provided with an opportunity to explain or interpret the status of the underlying assets, particularly explanations relating to performance trends which would affect whether an investor continues to hold the obligations he has purchased or whether a potential investor would purchase securities in a new deal from that issuer.

Still further, as the conventional reports provided by the trustee or servicer are presented to the investors via facsimile and/or contain status information for only a one month period, an investor, potential investor, or other interested party cannot easily download historical information regarding performance trends of the underlying assets for use, for example, on his own computer.

A system by Bloomberg provides information regarding the status of underlying assets of particular deals over a proprietary network to persons subscribing to the network. The information is substantially similar to the information provided in conventional reports from the trustee and/or service provider and is stored in a cumulative fashion which allows for viewing the information in a graphical format which displays trends over periods of time.

Unfortunately, the prior art methods and/or systems do not adequately address the needs in the art for a method and system for producing asset performance reports which: (i) provide historical information on the performance of the underlying assets, for example, time series data and performance trends (not merely static, point-in-time information for one month); (ii) are made readily and freely available to potential investors, and other interested parties; (iii) provide aggregate information as to the performance of a portfolio of underlying assets, where the portfolio contains aggregated assets from more than one deal (e.g., asset performance of all assets originated by an issuer in one year); (iv) provide information beyond that which is scripted by the indenture document (e.g., explanations or interpretations regarding the performance of the underlying assets, particularly explanations relating to performance trends); and (v) are available for electronically downloading to an investor, potential investor, or other interested party.

SUMMARY OF THE INVENTION

In order to overcome the disadvantages of the prior art, the present invention provides a structured finance performance analytics system and/or method for providing users with financial reports over a computer network, comprising the steps of: storing respective financial performance data for each of a plurality of securities, each security underlying one of a plurality of structured securities transactions sold by issuers to investors; maintaining an electronic site on the computer network to which the users may connect; receiving search criteria over the computer network from at least one of the users for identifying at least a subset of the financial performance data; retrieving the subset of financial performance data identified by the search criteria, at least some of the subset of financial performance data being arranged in a time series; and providing at least one electronic screen to the at least one user over the computer network, the at least one screen including the subset of financial performance data.

Other objects, features, and advantages of the present invention will be apparent to one skilled in the art from the following description of the invention with reference to the accompanying drawing.

BRIEF DESCRIPTION OF THE DRAWING

For the purposes of illustrating the invention, there are shown in the drawing forms which are presently preferred, it being understood, however, that the invention is not limited to the precise arrangements and instrumentalities shown.

FIGS. 3A-3I, 4A-4C, 5A-5C, 6A-6C, 7-11, 12A-12B, and 13-17 are examples of screens which may be produced and presented on a website in accordance with the invention.

DESCRIPTION OF THE PREFERRED EMBODIMENT

Figure 1:
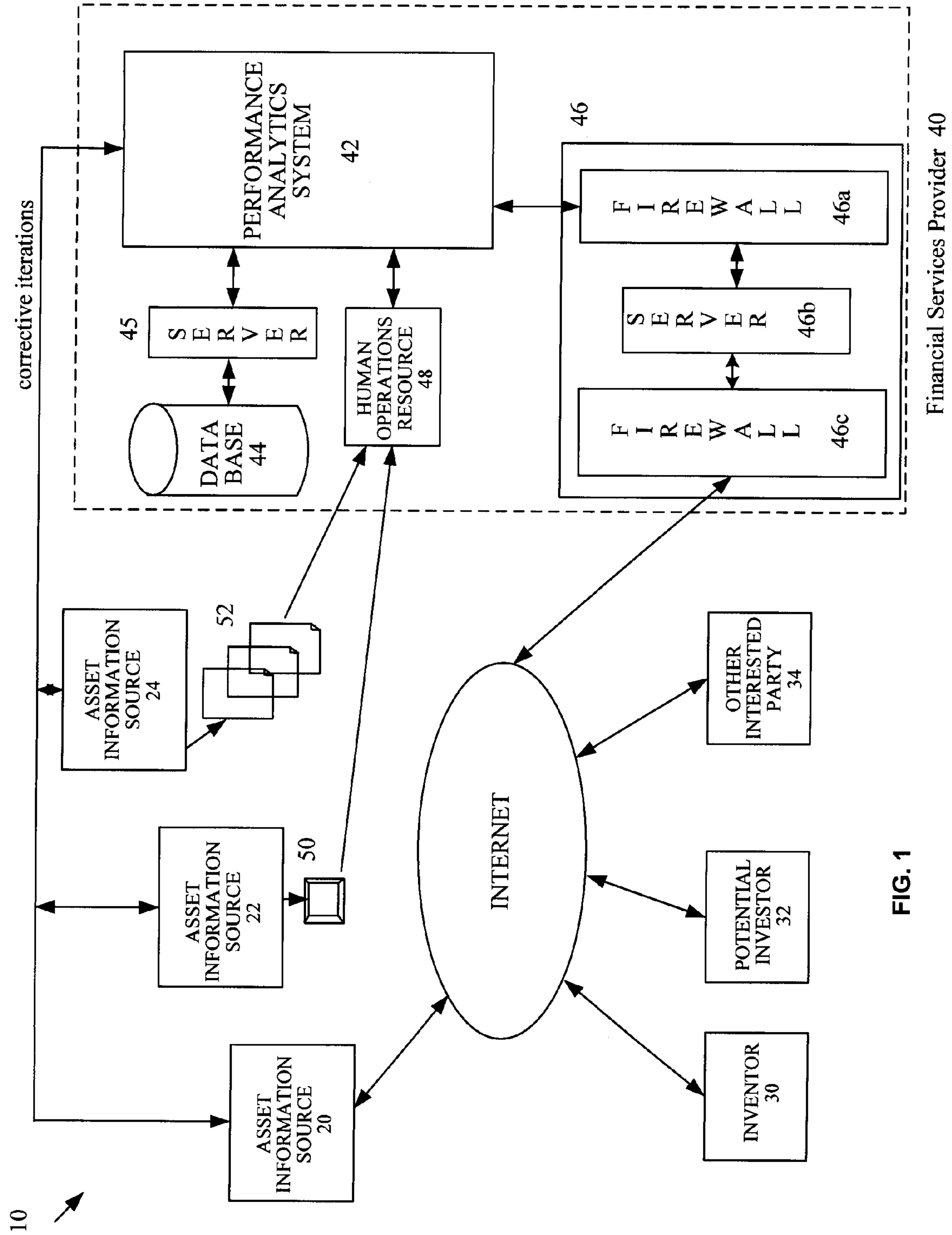
FIG. 1 is a block diagram illustrating a structured finance performance analytics system in accordance with the present invention.

Referring to the drawing wherein like numerals indicate like elements, there is shown in FIG. 1 a functional block diagram of a structured finance performance analytics system 10 in accordance with the present invention. The structured finance performance analytics system 10 includes a plurality of asset information sources 20, 22, 24. An asset information source is typically an issuer of a structured security instrument, such as an asset-backed security or mortgage-backed security. The asset information sources 20, 22, 24 may also be servicer, trustees, holders of interests in the underlying debts of the deals, or other source of asset information. For simplicity, the asset information sources may be referred to herein as issuers 20, 22, 24 as appropriate.

The structured finance performance analytics system 10 is utilized by one or more investors 30, potential investors 32, and/or other interested parties 34. An investor 30 is typically one or more parties who have purchased one or more securities from respective issuers 20, 22, 24.

A potential investor 32 may be one or more parties seeking to purchase one or more securities from an issuer 20, 22, 24. Thus, the potential investor 32 may be interested in the performance of the underlying assets relating to the deals of a particular issuer 20, 22, 24 to determine whether it would be advantageous to purchase such securities. Of course, the potential investor 32 may have previously entered into one or more deals with any of the issuers 20, 22, 24 but, in accordance with the invention, is permitted to access performance information on underlying assets related to other deals to which he is not a party.

Interested party 34 is any party seeking information regarding the performance of underlying assets relating to a structured financial deal of the one or more issuers 20, 22, 24. These parties include rating agencies, monoline insurers, research firms, investment banks, accounting firms, etc.

The structured finance performance analytics system 10 typically involves a financial services provider 40 (although not required), such as a bank or other financial institution. The financial services provider 40 includes a performance analytics system 42 which is capable of writing data to and receiving data from a database 44 through a database server 45. Those skilled in the art will appreciate that the database 44 need not be separate from the performance analytics system 42 and that any of the known databases and database servers may be utilized to achieve the advantages of the invention.

The financial services provider 40 also includes a network interface 46 which preferably includes a firewall 46*a*, and network server 46*b*, and a firewall 46*c*. The network interface 46 is operable to provide data transmissions between a network, for example, the internet, and the performance analytics system 42. Those skilled in the art will appreciate that any of the known hardware may be utilized in implementing the network interface 46.

The financial services provider 40 also preferably includes a human operation resource 48 which is operable to receive, format, and/or process data received from one or more of the asset information sources 20, 22, 24 and provide that data in a useable form for the performance analytics system 42. Additionally, the human operations resource 48 may provide formatting and/or processing functions on data received by the performance analytics system 42 through the network interface 46 and then return that data to the performance analytics system 42 in a more usable form.

Preferably, the asset information sources 20, 22, 24 provide data to the performance analytics system 42 over a network, for example the internet, and through the network interface 46. For example, the asset information sources 20, 22, 24 may provide the asset performance data to the performance analytics system 42 by way of electronic data interchange, such as e-mail. If an electronic data interchange is to be used, the asset information source 20 would preferably have a data tracking system capable of assembling the asset performance data into an electronic file. Preferably, this file will be in a structured format, such as a spreadsheet or other agreed upon database format such that the performance analytics system 42 may readily utilize the data without requiring reformatting.

The transfer of asset performance data via e-mail presents a security issue because files sent over the internet can be intercepted and misused. Those skilled in the art will appreciate that encryption technology may be implemented to improve security and facilitate the safe transmission of asset performance data between an asset information source 20, 22, 24 and the performance analytics system 42.

The asset information sources 20, 22, 24 may also provide the asset performance data to the financial services provider 40 by way of bulletin board, such as by way of a secure bulletin board system. Although somewhat slower than e-mail, sending the asset performance data electronically via the bulletin board will eliminate the security issue.

When an asset information source 22, 24 does not have the capability of transferring data concerning the performance of the underlying assets in electronic form over a network then it may provide the data on a transportable storage medium, such as a floppy disk 50 or other such device to the human operation resource 48. The human operation resource 48 reads the data on the floppy disk 50, formats and/or processes the data and delivers usable data to the performance analytics system 42.

If an asset information source 24 does not have the capability of delivering electronic data in any form, then it can provide hard copy information 52 to the human operation resource 48. The human operation resource 48 preferably provides the functions of formatting and/or processing the data contained in the hard copy 52 and providing that data to the performance analytics system 42 in a usable form. The hard copy 52 may be in a structured format, such as on paper ledgers, but would require the human operations resource 48 to reformat and process the asset performance data into an electronic form for delivery to the performance analytics system 42. If the hard copy 52 is not in a structured format, such as a series of trustee and/or service provider reports for each structured securities transaction (or deal), the human operations resource 48 would review the documents and perform data entry such that the asset performance data may be formatted and processed to deliver a useable electronic version of data to the performance analytics system 42.

It is preferred that the performance analytics system 42 manipulates the asset performance data supplied by the asset information sources 20, 22, 24 and produces reports. Preferably, the reports are posted on an internet website such that the investors 30, potential investors 32, and/or other interested parties 34 may review and/or download the information presented on the website.

The reports preferably include document reports, transaction performance analytic reports, and/or aggregate analytic reports. Document reports contain legal and disclosure documentation defining the structured transactions of the issuers and may include reports describing the initial portfolio of assets securing the securities. In particular, document reports may include: (i) prospectuses (original transaction offering documents prepared in collaboration with underwriters and legal counsel for respective deals); (ii) Pooling and Servicing Agreements (primary documents that govern the structured transaction, including the roles of the trustees, service providers, and bond issuers); and (iii) rating letters (documents from rating agencies confirming the ratings of each structured transaction or deal).

Transaction performance analytic reports may include collateral descriptions which contain data relating to characteristics of the securitized assets. These data are preferably arranged according to criteria agreed upon between the asset information sources 20, 22, 24 and the financial services provider 40. The collateral descriptions are preferably updated on a periodic basis, such as monthly, to reflect changes in the performance of the underlying assets.

Transaction performance analytic reports may, more particularly, include prepayment analyses, which include data showing the rates of prepayments on the underlying collateral (e.g., loans). These rates may be provided on a monthly, quarterly, annually, or life basis and are preferably updated monthly. Loss and delinquencies analyses may also be included in the transaction performance analytic reports. Loss and delinquency analyses are similar to prepayment analyses, except actual losses and delinquencies are tracked, and usually grouped into 30, 60, and 90-day past due categories.

The transaction performance analytic reports may also include trigger testing reports containing the performance of an underlying pool of assets against a trigger. Triggers are objective measures of the performance of an underlying pool of assets set forth in the Pooling and Servicing Agreement which, if met, may trigger additional rights for the parties to the deal. For example, a trigger may be met if delinquencies on the underlying pool of assets exceeds 10% in a three month period. Meeting the trigger may result in the investors being permitted to receive additional cash flow.

Aggregate analytic reports may contain data relating to the performance of assets from more than one deal from the same issuer. For example, information on the performance of loan assets issued in a particular year, regardless of whether those loan assets are associated with more than one deal, may be presented. In other words, the underlying pools of assets may be grouped according to some criteria, such as credit grade, coupon type (fixed/adjustable), loan to value ratio, property type, year, etc. More effective criteria will likely include multiple criteria, such as fixed rate loans AND year of origination.

Aggregate analytic reports may also include prepayment analyses which are similar to prepayment analyses for a transaction performance analytic report except that the aggregate prepayment information on the underlying pools of assets may be obtained and aggregated over more than one deal. Similarly, aggregate loss analyses may also be obtained and reported.

The reports produced by the performance analytics system 42 may be in text format, tabular format, or graphical format. Preferably, the graphs include time series data obtained by collating performance data over a number of months and presenting that data in a time series such that performance trends may be gleaned from the report. This requires that the asset information sources 20, 22, 24 provide the asset performance data on a periodic and preferably monthly basis such that the performance analytics system 42 may store, produce and subsequently present the historical performance data on the website.

The performance analytics system 42 must receive the asset performance data from the asset information sources 20, 22, 24 on a periodic basis and store that data in the database 44 for subsequent use. Preferably, an asset information source 20 and the financial services provider 40 agree upon the type and format of the asset performance data to be provided and the type and format of the reports to be posted on the website.

Initially, an asset information source 20 may provide the financial services provider 40 with information to produce a master file in the database 44. The master file preferably contains the deal numbers, loan numbers, loan origination dates, credit ratings, loan types, and principal balances for the pool of assets relating to each structured financial securities transaction for which asset performance data will be provided. Accordingly, the performance analytics system 42 will have stored information on each deal number, all loan numbers (i.e., the pool of underlying assets) for each deal and the loan origination date, credit rating, loan type, and principal balance for each of the loans. Those skilled in the art will appreciate that other information may be included in the master file without departing from the scope of the invention.

Once the performance analytics system 42 has obtained a master file for a particular deal, the asset information sources 20, 22, 24 preferably provide a periodic (e.g., monthly) data file including asset performance data during the period in question. The monthly data file preferably includes the deal number, effective date of the file (i.e., the date for which the data is current), loan numbers, scheduled ending principal balances, delinquency information, loss amount information, and group number (i.e., information as to the credit grade, fixed or variable). The asset performance data contained in the monthly data files are stored in the database 44 and later used to produce the reports for posting on the website.

Those skilled in the art will appreciate that the master file and monthly data files may be in any ASCII compatible format, such as Microsoft Excel and/or Microsoft Access files.

If an asset information source 20, 22, 24 begins its relationship with the financial services provider 40 sometime after a particular deal was closed and monthly asset performance data has already accrued, then the asset information source 20, 22, 24 preferably provides the performance analytics system 42 with substantially all of the historical asset performance data such that the database 44 may be updated and complete.

Figure 2:
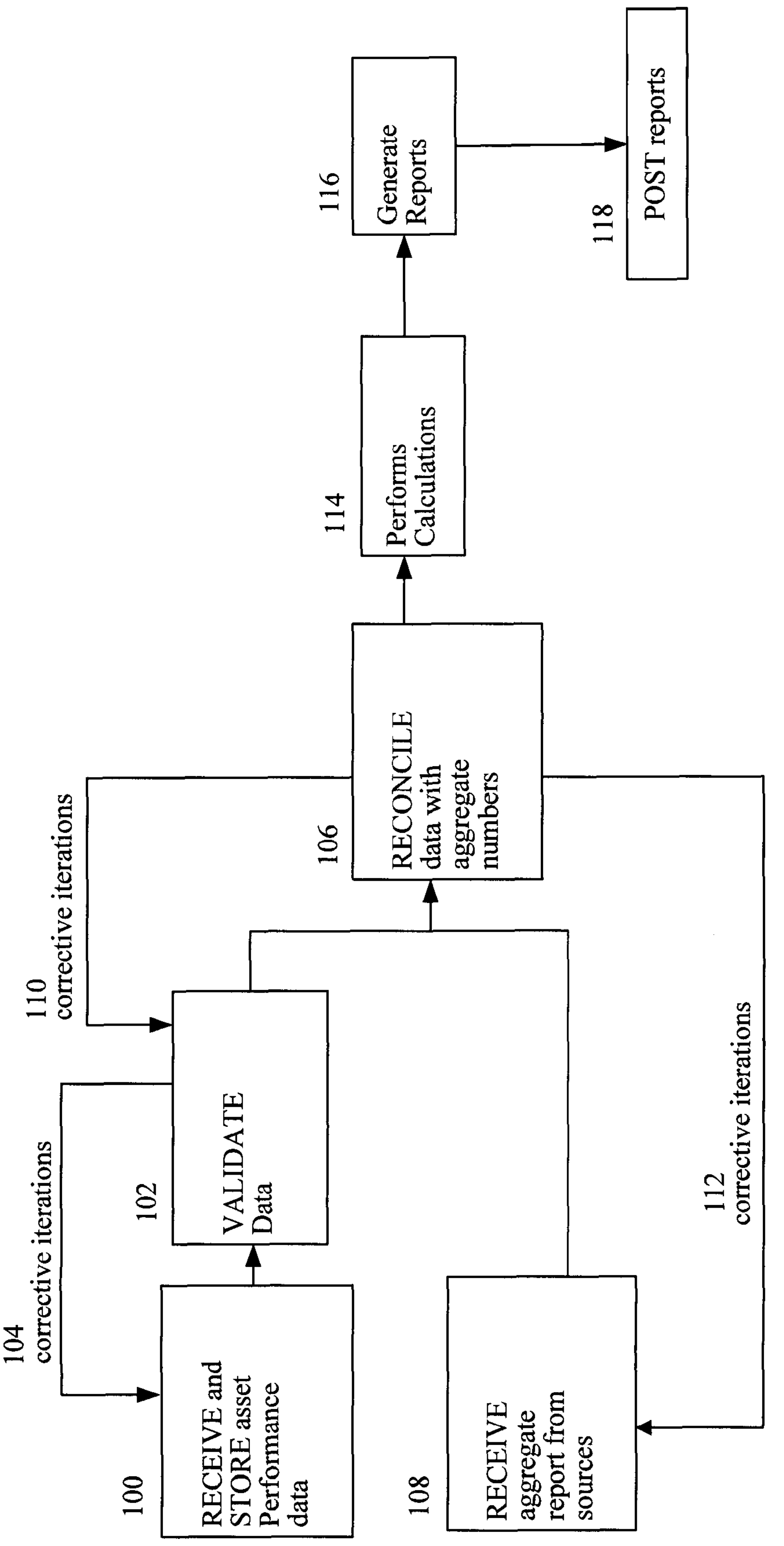
FIG. 2 is a flow diagram illustrating an example of the process flow of the structured finance performance analytics system shown in FIG. 1.

Reference is now made to FIG. 2 which illustrates a flow diagram for providing validity checks on the asset performance data received by the performance analytics system 42. Although the financial services provider 40 need not guarantee that the reports posted on the internet website are error-free, certain validity checks are preferably performed on the incoming asset performance data from the asset information sources 20, 22, 24.

At step 100, the financial services provider 40 receives the asset performance data and, if necessary, formats and processes the data by way of the human operation resource 48. When the asset performance data is received by the performance analytics system 42, it is preferably organized into a relational database within the database 44. In particular, the data related to the principal, prepayments, delinquencies, losses, foreclosures, etc., on the underlying assets are arranged according to loan number and deal number to coincide with a given month to which they pertain. Some data fields would simply contain the particular value (such as the principal received) for that month while other fields would be derived from these fields, such as loan to value ratio, prepayment rates, delinquency rates, loss rates, foreclosure rates, etc.

At step 102, the performance analytics system 42 validates the data and identifies potential errors based upon preset error screens. Examples of the process of validating the data include:

(i) confirming that only numbers exist in numerical fields;

(ii) confirming that only dates are in date fields;

(iii) confirming that only text are in text fields;

(iv) confirming that only positive numbers are in fields that would only properly contain positive numbers (such as outstanding principal, prepayment values, etc.);

(v) confirming that no percentages are greater than 100 or some other threshold (such as prepayment rates not exceeding approximately 30%); and/or (vi) confirming that the outstanding principal is not greater than the original balance of a particular loan.

Other examples of the types of information for which validity checks are performed on the asset performance data include: original loan amounts, original term, APR, current principal balance, original amortization term, remaining amortization term, current payment, maturity date, next payment due date, loan to value ratio, scheduled seasoning, actual seasoning, funded date, occupancy status, property type, loan type, document type, loan purpose, lien position, credit rating, state, and (if the loans are adjustable), index, next rate adjustment date, life floor, life cap, margin, periodic rate, and/or months to roll.

If discrepancies are identified at the validate data step 102, then the performance analytics system 42 may provide a flag or some other indication that a corrective iteration 104 should take place between the financial services provider 40 and the respective asset information source 20, 22, 24 to correct the data.

Periodically, each asset information source 20, 22, 24 preferably provides an aggregate report to the financial services provider 40 which includes aggregate values covering more than one of its deals, for example, aggregate principal values, aggregate interest values, aggregate prepayments, etc. (step 108). These aggregate reports are reconciled against corresponding aggregates computed by the performance analytics system 42 at step 106. If any discrepancies are identified, corrective iterations 110 may be taken with respect to the validation data step 102 and/or corrective iterations 112 may be taken with respect to the asset information sources 20, 22, 24.

Once the asset performance data provided to the financial services provider 40 has been validated 102 and reconciled 106, at step 114 the performance analytics system 42 performs analysis and manipulation functions on the stored asset performance data to create the reports to be posted on the website. Typically, this includes segregating the data according to the particular structured security transactions (or deals) that are being reported.

Preferably, the database 44 is segregated into a plurality of main databases, one main database for each asset information source 20, 22, 24. The main database for each asset information source may then be subdivided by the number of structure security transactions being tracked, where each sub-database represents one such transaction. Those skilled in the art will appreciate that the performance data of one asset out of an asset pool will reside in only one sub-database since one such asset can not secure multiple securitizations.

The fields of a sub-database contain data which may be used to build a report, such as a time series of the principal, interest, prepayments, delinquencies, losses, foreclosures, etc. for a pool of assets underlying a particular structured securities transaction. This data may be grouped into a time series to prepare a report in a graphical format such that the investors 30 may readily see trends in the performance of the underlying asset.

Other reports, such as loan to value ratio, delinquency rate, prepayment rate, foreclosure rate, etc. may be calculated (e.g., using spreadsheet programs) from the fields within the sub-databases relating to the particular structured securities transactions. Again, it is preferred that time series graphs be produced and reported on the website so that the investors 30 or other interested parties 32, 34 may see trends in the performance of the underlying assets for particular transactions.

In order to create aggregate analytical reports, the database 44 is preferably segregated according to the criteria (loan origination, year, credit grade, property type, loan type, fixed/floating, loan to value ratio, etc.). Sub-databases are preferably produced for each criteria. These criteria are preferably predetermined and agreed to by the asset information sources 20, 22, 24 and the financial services provider 40. Those skilled in the art will appreciate that the sub-databases for the criteria will contain performance data for assets that may also be contained in other sub-databases depending on how the criteria are defined. This is so because aggregate reports contain asset performance data relating to assets underlying more than one structured securities transaction.

The performance analytics system 42 retrieves the data contained in the main database and sub-databases within the database 44 to produce the transaction performance analytic reports and/or the aggregate analytic reports. The specific algorithms required to produce these reports are well known in the art and, for simplicity and clarity are not repeated herein.

FIGS. 3A-3I, 4A-4C, 5A-5C, 6A-6C, 7-11, 12A-12B, and 13-17 show examples of the types of screens which may be prepared and then presented on a website (either public or private) in accordance with the invention.

Reference is now made to FIG. 3A, which is an example of a screen which may be produced and presented on a website in accordance with the present invention. An investor 30, potential investor 32, and/or other interested party 34 (for simplicity, hereinafter referred to as an investor 30 as appropriate) accesses the website in accordance with known techniques. Preferably, when investors 30 first access the website, they are provided with a registration screen which provides "sign up" icons and/or input fields. When the investor 30 invokes the sign-on process, the financial services provider 40 may request certain information 60 pertaining to the investor 30, such as his or her name, business type, company, department, address, phone numbers, e-mail addresses, etc., in exchange for a user name and password 61 for subsequent entry to the website.

Preferably, when an investor 30 has registered with the financial services provider, the investor's activity within the website may be tracked and used for appropriate marketing analysis.

Figure 3B:
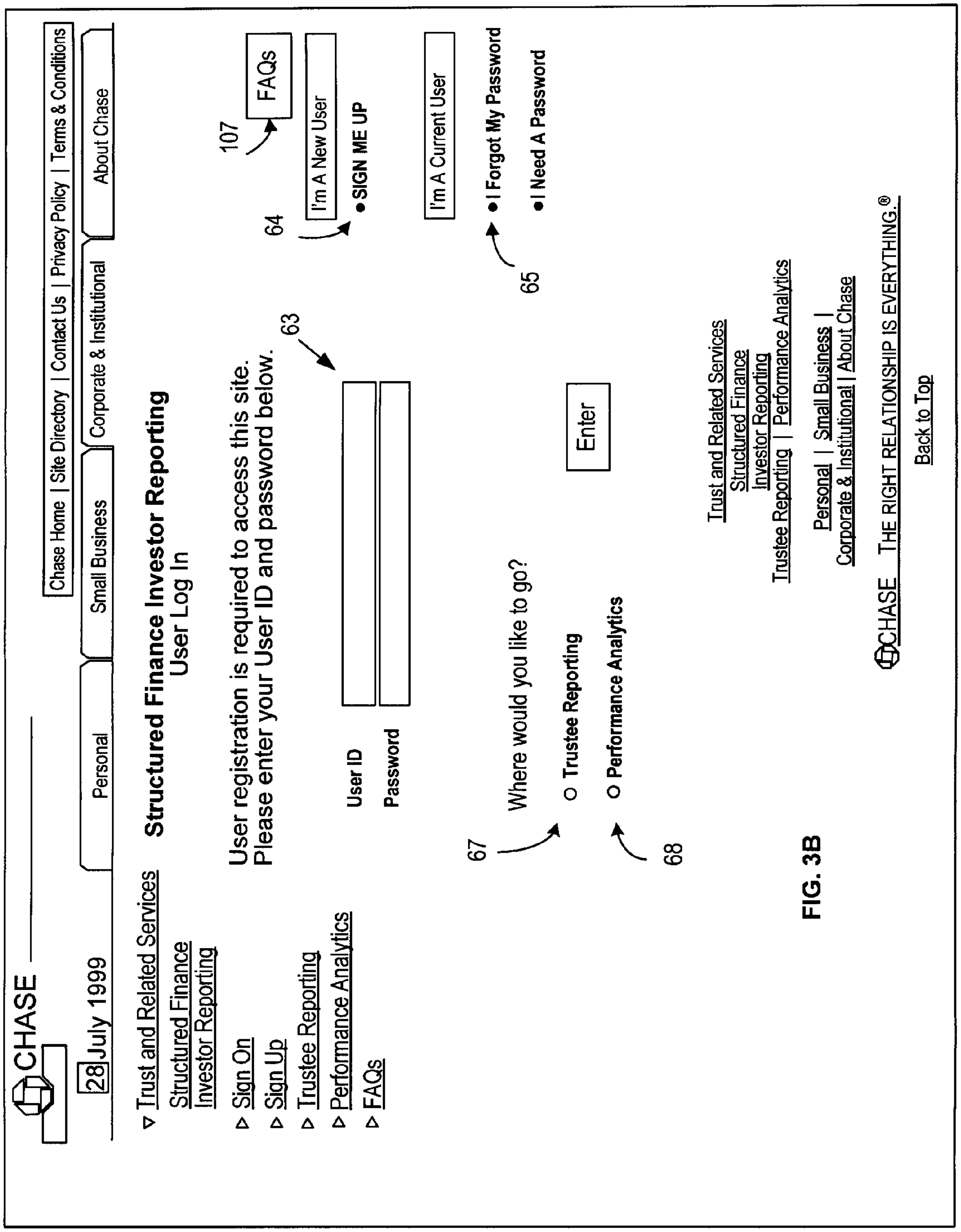

Reference is now made to FIG. 3B, which is an example of a screen which may be produced and presented on a website in accordance with the present invention which facilitates log in to the website of the invention. The investor 30 enters his/her user name and password into fields 63 as is well known in the art.

If the website provides only public structured securities transactions, once an investor 30 enters the website he may obtain reports from any of the deals (even though he may have had to present his user ID and password). Those skilled in the art will appreciate that a public website may be accessed by anyone having a link to the interne. If desired, private (i.e., non-public) structured securities transactions may be presented on a website which is secured such that it would require an investor 30 to apply for and obtain a user ID/password (subject to a verification process) to enter the website. For a private website password and security support is preferably provided on a 24/7 basis through an 800 number system. Any of the known mechanisms may be provided which would link a particular investor 30 who has been permitted access to a private website to view only those reports relating to particular transactions (not all transactions). Preferably, permitted transactions would be linked to a particular user account, identified by user ID.

The investor 30 may request conventional trustee reports by activating an appropriate link and/or field 67 or the investor may request performance analytics reports by way of link and/or field 68.

Preferably, the investor 30 may select a frequently asked questions icon (FAQs) 107 which is preferably operable to provide the investor 30 with additional information on the use of the website. With reference to FIG. 3C, when an investor 30 selects the frequently asked questions icon 107, a plurality of frequently asked questions may be presented on a screen with the appropriate response provided.

Figure 3E:
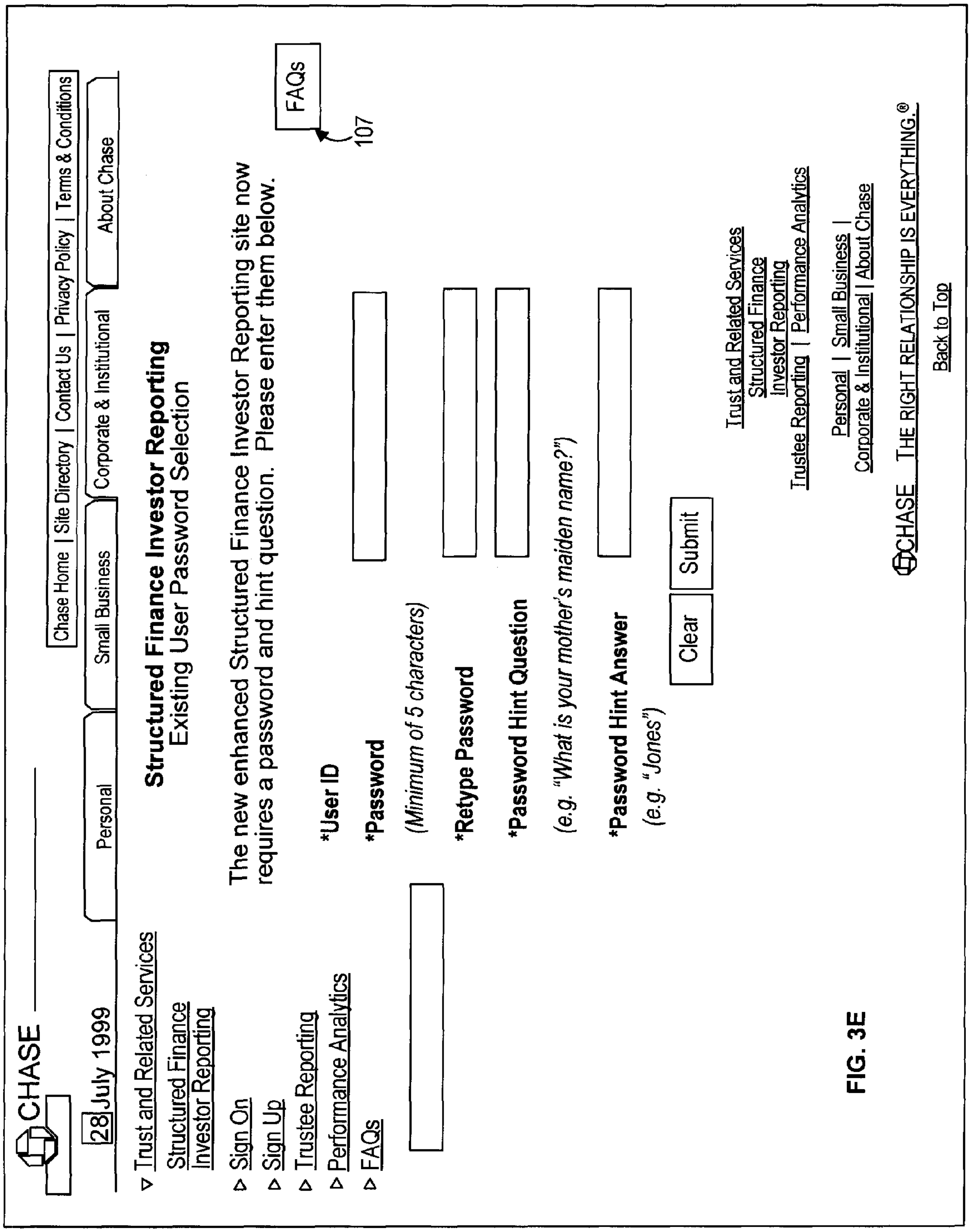

Links are also preferably provided to the sign up screen (FIG. 3A) at 64 and an "I forgot my password" screen (FIGS. 3D and 3E) at 65. When the investor 30 forgets his password, he is preferably prompted to answer a hint question, for example, his/her mother's maiden name 66. If the investor does not recall the hint question, the question may be expressly provided. The investor is provided with his password of the hint question is answered correctly. (FIG. 3E illustrates an alternative "I forgot may password" screen).

Figure 3F:
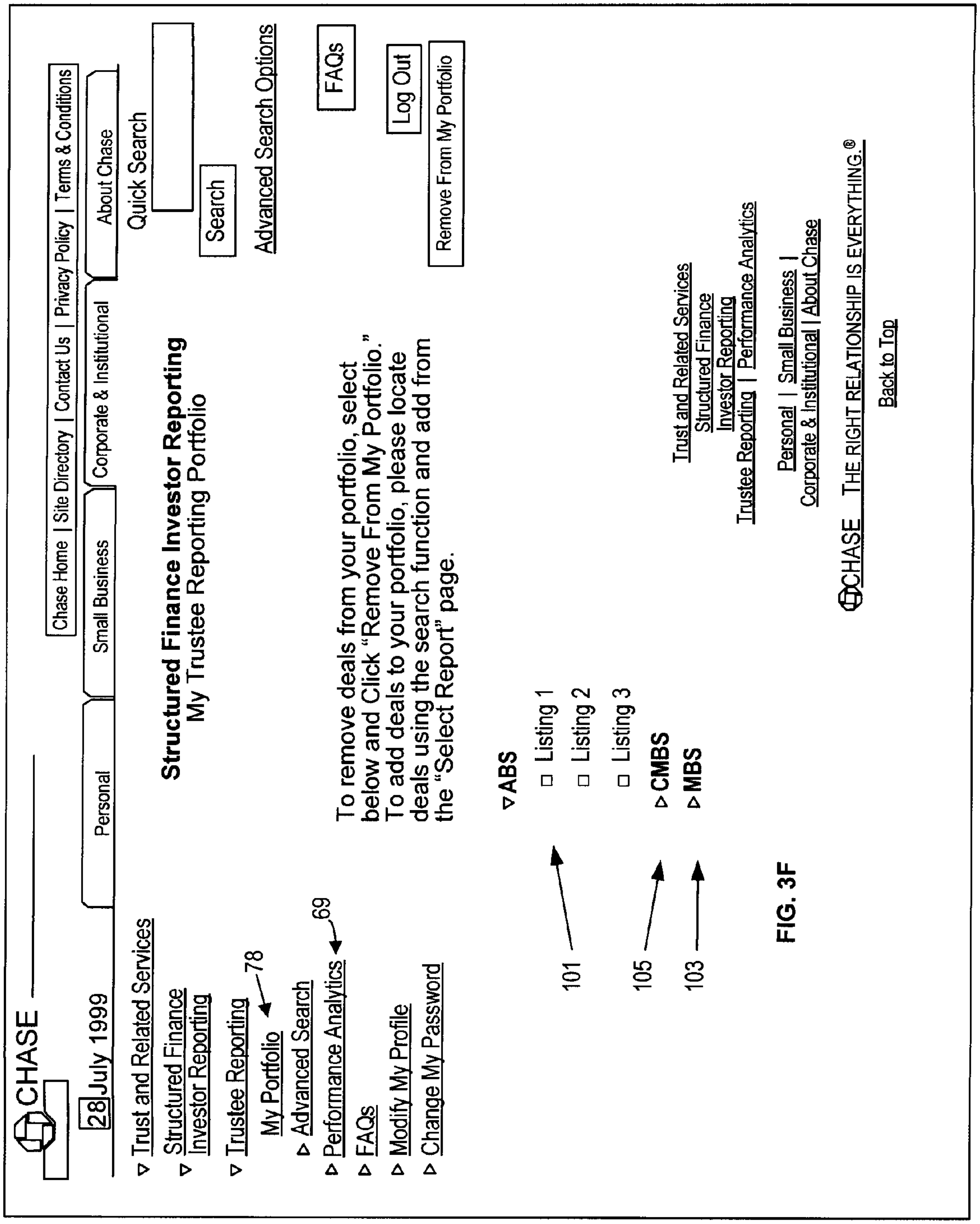

Reference is now made to FIG. 3F which illustrates a screen which may be presented to the investor 30 when trustee reporting is desired. The screen preferably prompts the investor 30 to choose from a plurality of classes of transactions, such as asset-backed securities (ABS) 101, mortgage-backed securities (MBS) 103, and/or commercial mortgage-backed securities (CMBS) 105.

As discussed above, trustees provide static reports on a monthly basis and these reports are preferably provided to the investor 30 only if desired. When the investor 30 wishes to obtain performance reports (e.g., transaction performance analytic reports and/or aggregate analytic reports) he may activate a link 69 which preferably presents the screen of FIG. 3G to the investor 30.

Figure 3G:
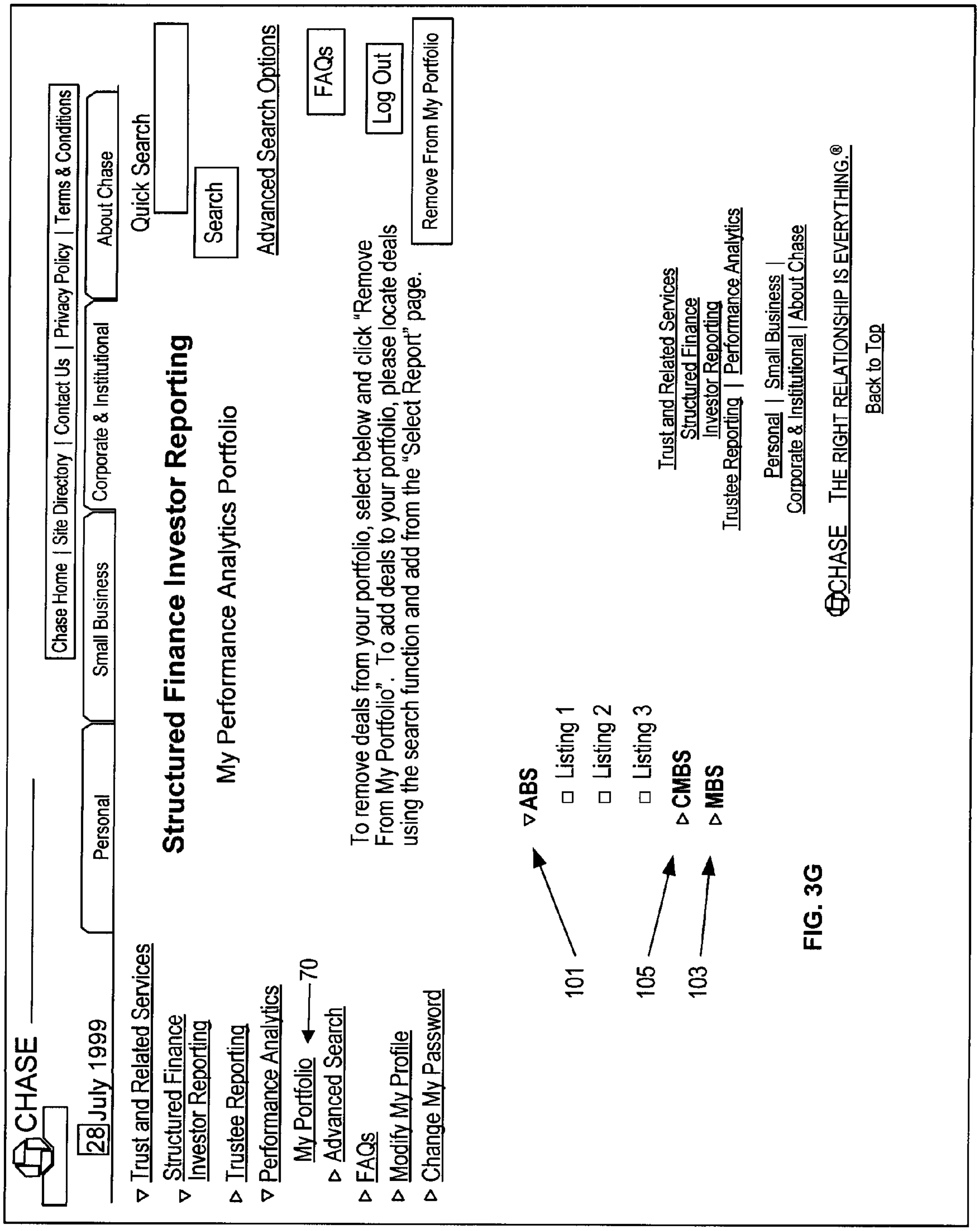

As illustrated in FIGS. 3F, 3G, the investor 30 may have previously selected certain reports to be available whenever the website is accessed. In particular, listings 1, 2, 3 (i.e., pre-requested reports) are available under the ABS icon 101 (trustee reports FIG. 3F or performance analytics reports FIG. 3G). Listings 1, 2, 3 may be deleted or modified as desired. If no listings were previously defined, the investor 30 may invoke the "My Portfolio" link 70 which preferably provides the screen of FIG. 3H or FIG. 3I, depending from which of FIG. 3F or 3G the link is activated.

Figure 4A:
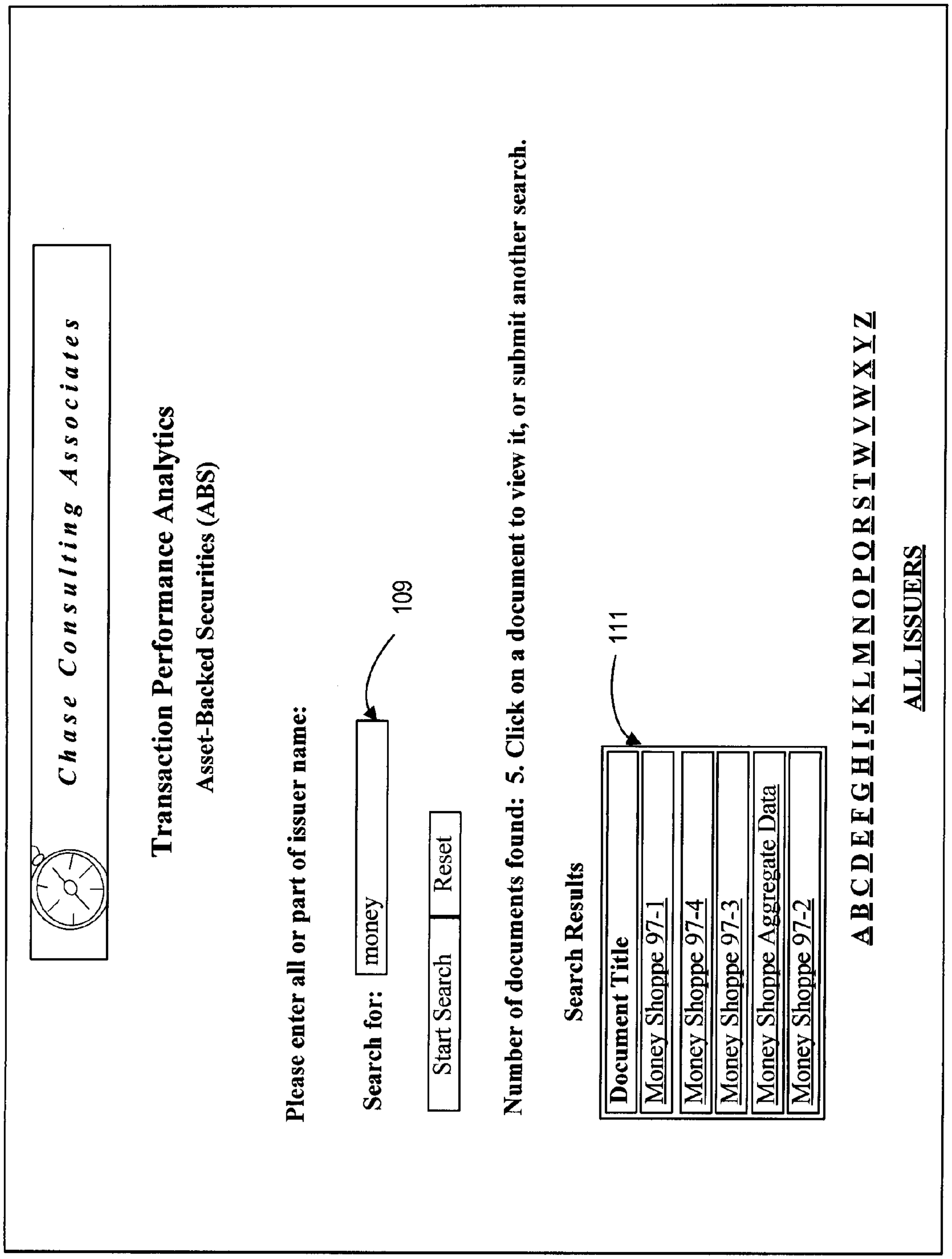

In each of the screens shown in FIGS. 3H and 3I, the investor 30 is preferably prompted to select at least one of: (i) a class of transaction(s) ABS 101, MBS 103, CMBS 105; and (ii) provide all or a part of an issuer's name (or other keywords) in a text window 109. Deals may be searched alphabetically at input fields 71. When the investor 30 enters the keyword "money" into the text box 109 of FIG. 3I, a search result 111 is preferably provided as shown in FIG. 4A for performance analytics. The search results 111 lists a predetermined number of reports (for example, 5, 10, 20, etc.) related to the keyword provided in the text box 109. As shown, an issuer known, for example, as The Money Shoppe has five reports available for view, four of the reports being related to specific structured securities transactions 97-1, 97-2, 97-3, and 97-4. The search results 111 also include a report relating to aggregate data concerning more than one transaction.

Figure 4C:
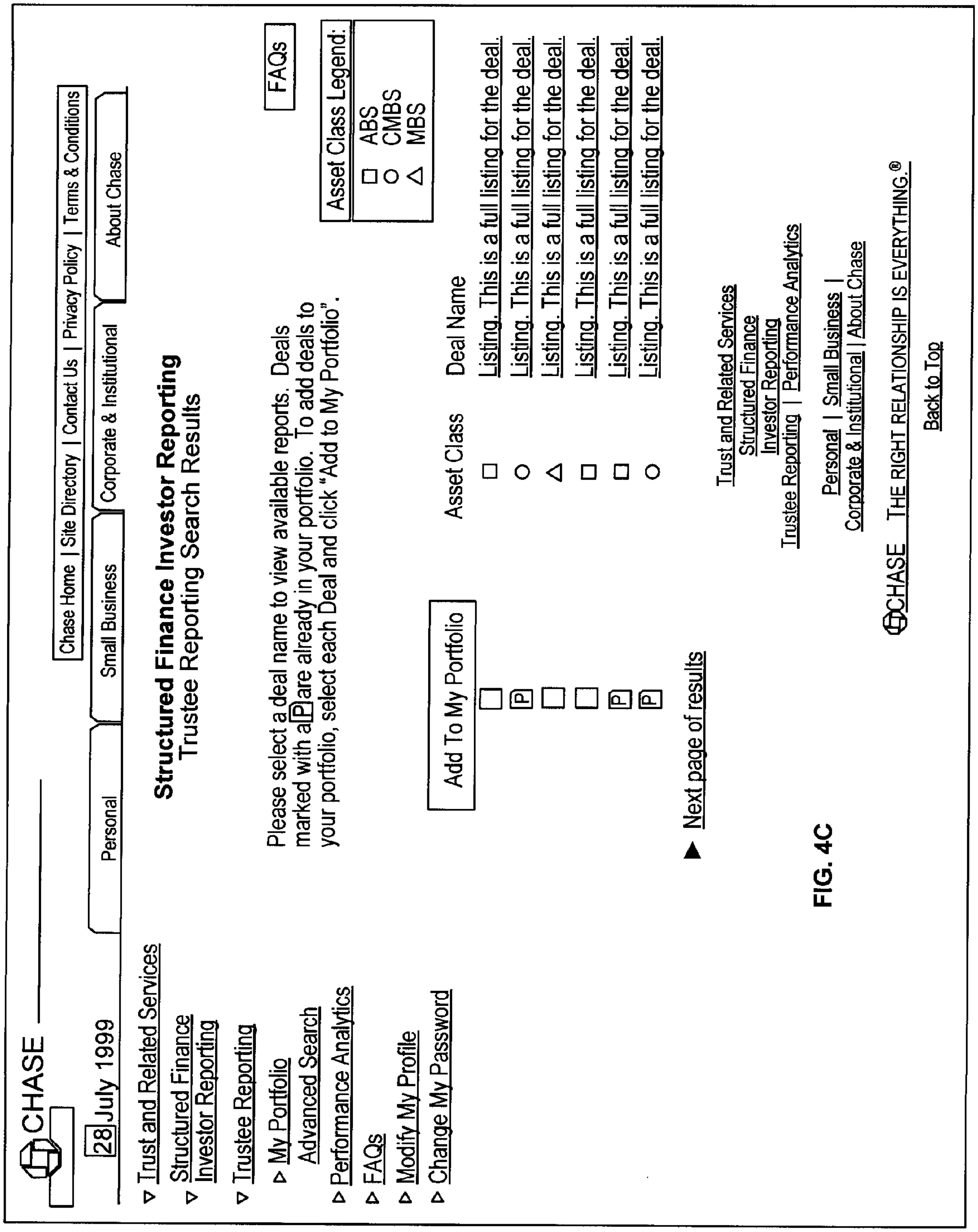

Those skilled in the art will appreciate that search results may be presented in any number of ways, FIG. 4A being only an example. FIGS. 4B and 4C illustrate alternative examples of search result information, relating to performance analytics and trustee reports, respectively. Each of FIGS. 4B and 4 C preferably list the search results in terms of class (e.g., ABS, MBS, CMBS), deal name, and whether the deal is already been selected for addition to the investor's portfolio of reports (i.e., the pre-requested reports).

Those skilled in the art will also appreciate that so-called advanced searches may also be performed which, for example, may involve selecting more than one class (ABS, MBS, CMBS) in FIG. 3H or 31.

Figure 5A:
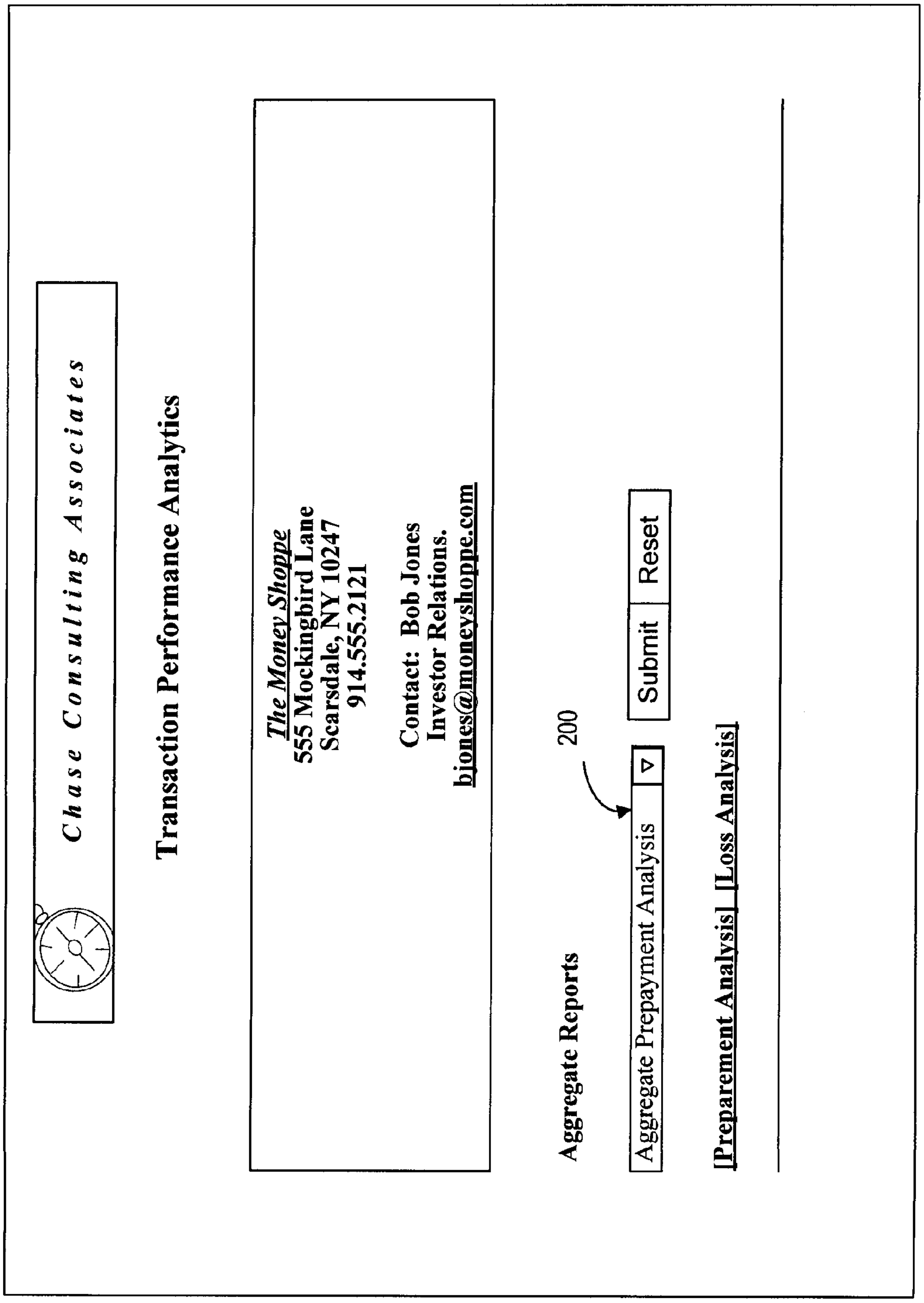

When an investor 30 selects the aggregate data report from the search results 111 (FIG. 4A), the website preferably provides a screen as shown in FIG. 5A. The report selection is displayed in window 200. Alternatively, the investor 30 may select a particular deal from those listed in FIG. 4B and select one or more reports using the screen shown in FIG. 5B. The deal name appears at location 74, the issue documentation selections (e.g., indenture agreement, etc.) appear at location 75, and the performance report selections appear at location 76. As with FIG. 5A, the performance report selections 76 preferably include prepayment analysis and loss analysis.

Figure 5B:
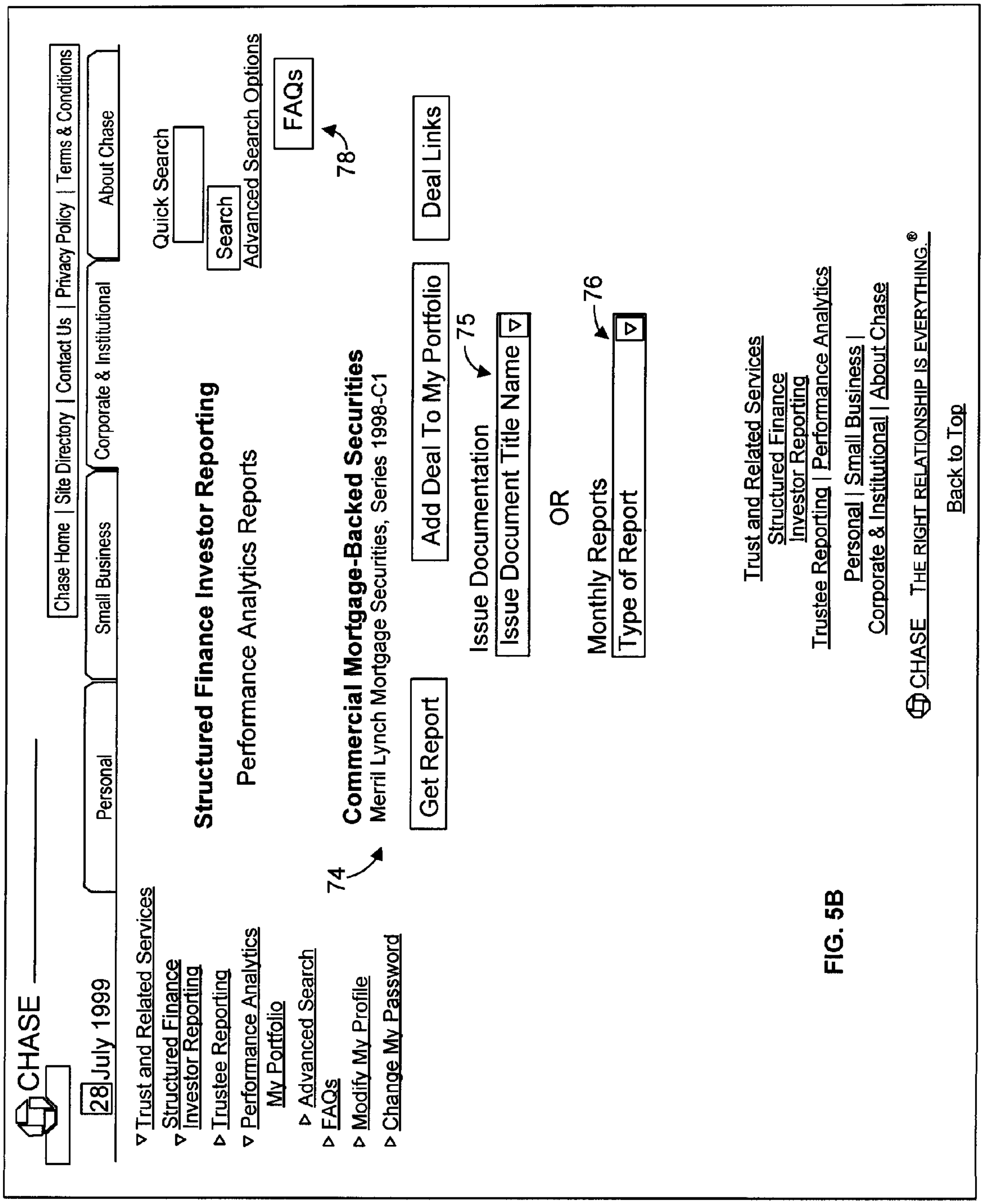
Figure 5C:
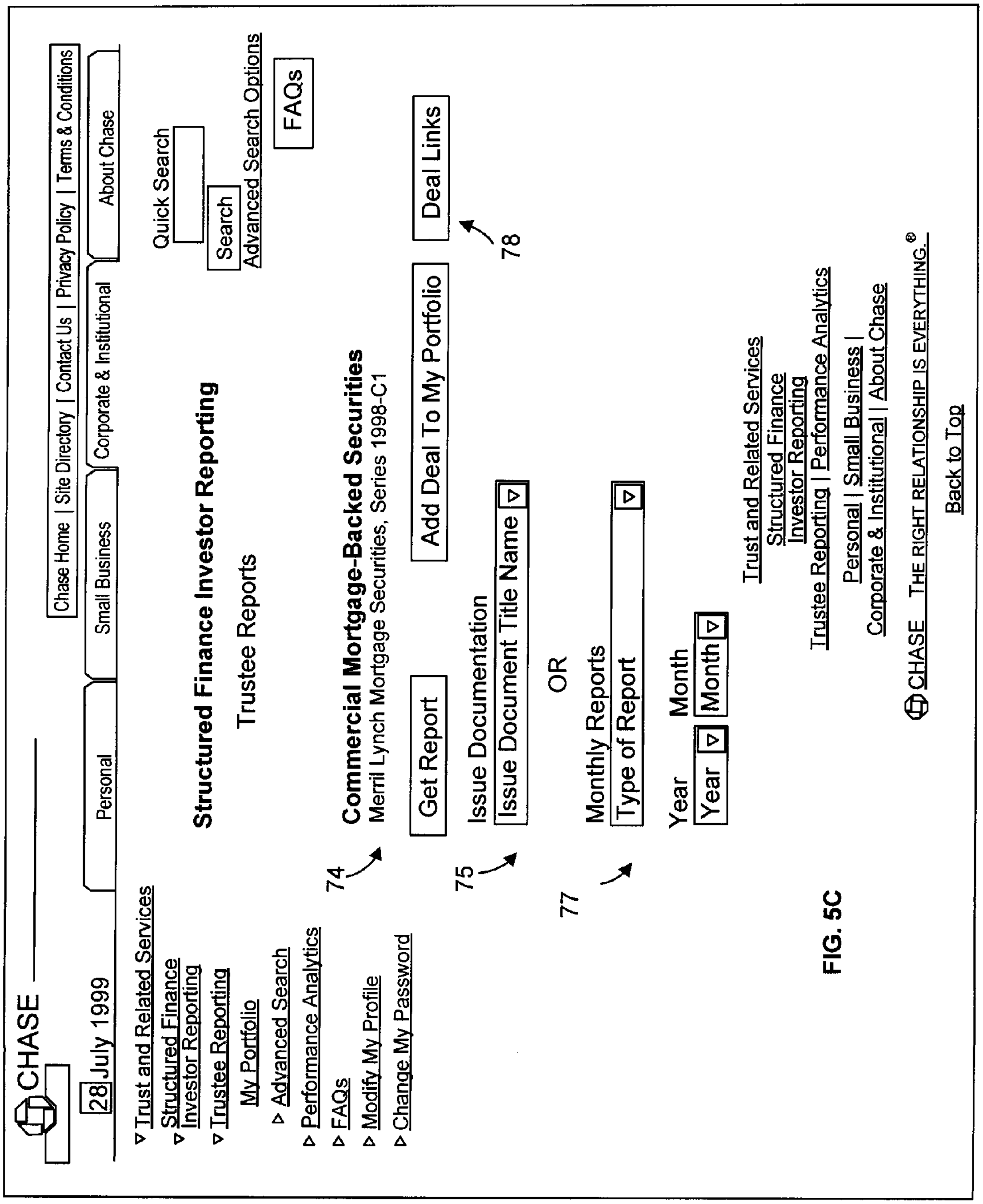

FIG. 5C illustrates a screen which is preferably provided to the investor 30 when a particular deal (shown at location 74) is selected from the list of deals of the screen shown in FIG. 4C, i.e., trustee reports. Again, the issue documentation selections are provided at location 75. Of course, trustee monthly reports selections are provided (as opposed to performance reports) at location 77 and may be accessed by, for example, year and month.

Figure 6B:
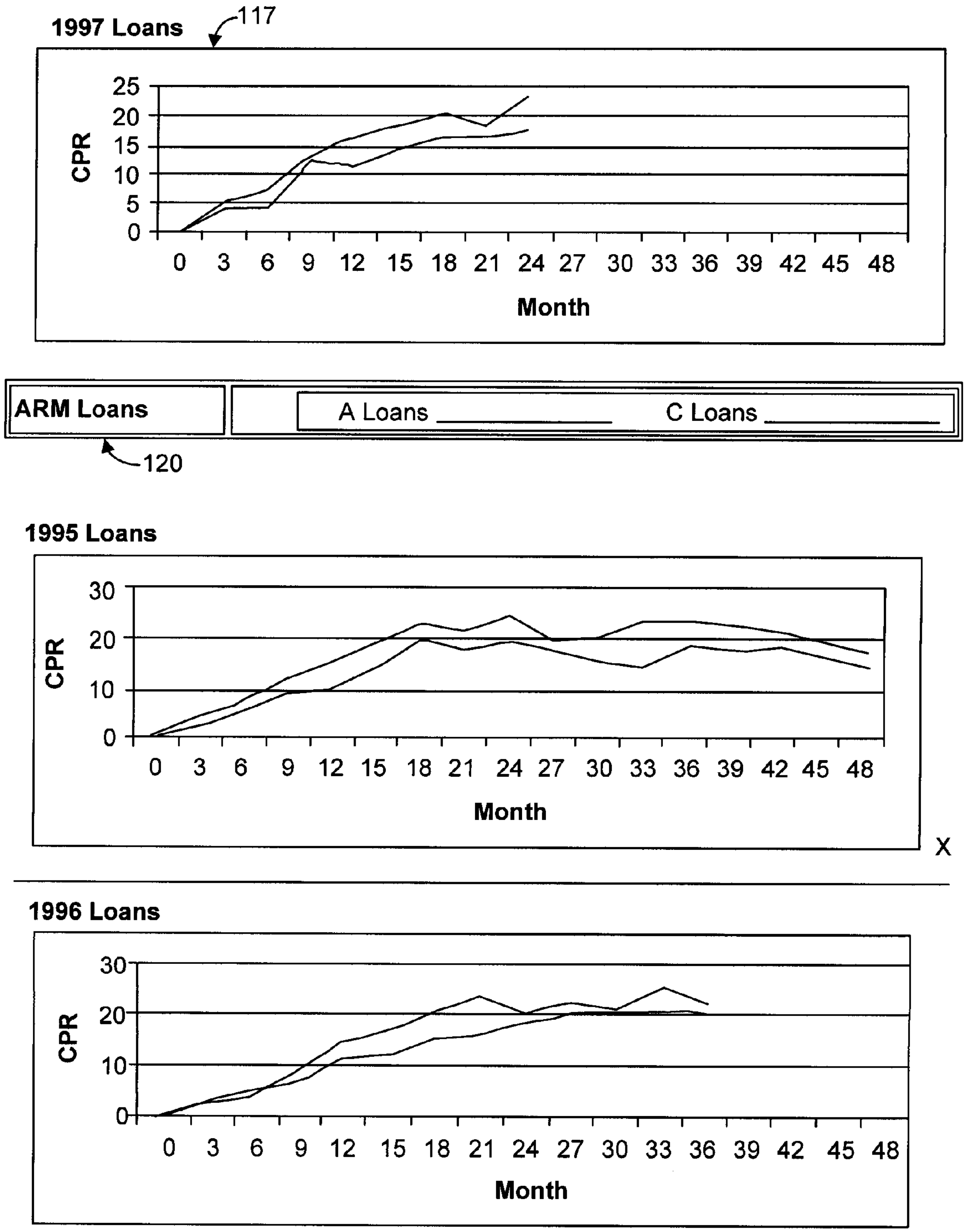

Whether from FIG. 5A or 5B, the investor 30 may select, for example, [prepayment analysis] details and/or [loss analysis] details. When an investor 30 selects the [prepayment analysis] option, one or more screens as shown in FIGS. 6A-6B are preferably provided. This type of report relates to aggregate asset performance data (or portfolio performance data) concerning more than one transaction for The Money Shoppe (or any selected deal). More particularly, the aggregate data report provides a plurality of graphs illustrating the constant prepayment rate for certain loans as a function of time (e.g., months).

Predetermined criteria are preferably provided by the investor 30 and used to define the aggregate asset performance data for these loans, the criteria including the year of origination, and loan type (i.e., fixed rate or adjustable rate). The graphs include the constant prepayment rate (CPR) for loans from different transactions grouped according to origination year, i.e., origination year 1995 (at location 113), origination year 1996 (at location 115), and origination year 1997 (at location 117). In this example, the loans are all fixed rate as indicated in box 119.

The graphs for the 1995, 1996, and 1997 loans each include time series data for the class of loans (e.g., class A and class C loans). Accordingly, the investor 30 advantageously may note the trends in the performance of these loans over time and also may easily compare the performance of class A loans and class C loans. Referring to FIGS. 6B and 6C, similar graphs may be provided on screens relating to adjustable rate mortgage loans (see box 120).

Preferably, explanations and/or interpretations of the data in the graphs of FIGS. 6A-6C are provided proximate to the graphs, particularly explanations of trends, although for simplicity, these explanations are not shown in the Figures.

The website as described hereinabove is preferably adapted in a way which permits an investor 30 to interact with and change the way the asset performance data is presented. In particular, an investor may customize the graphical and/or tabular data presented on the screens. For example, with respect to FIGS. 6A-6C, a particular investor 30 may desire to view the constant prepayment rate for various assets over a number of months specified by the investor 30. More particularly, the investor 30 may wish to view the constant prepayment rate for 1995 fixed rate loans (location 113) over months 15-30 rather than from origination to month 48. This may be accomplished using any of the known methods, such as via interactive icons, screens, pull down boxes, etc.

Additionally, an investor 30 may wish more or less resolution on the vertical axes of particular charts and may be provided with the opportunity to specify this quantity using any of the known methods.

Figure 7:
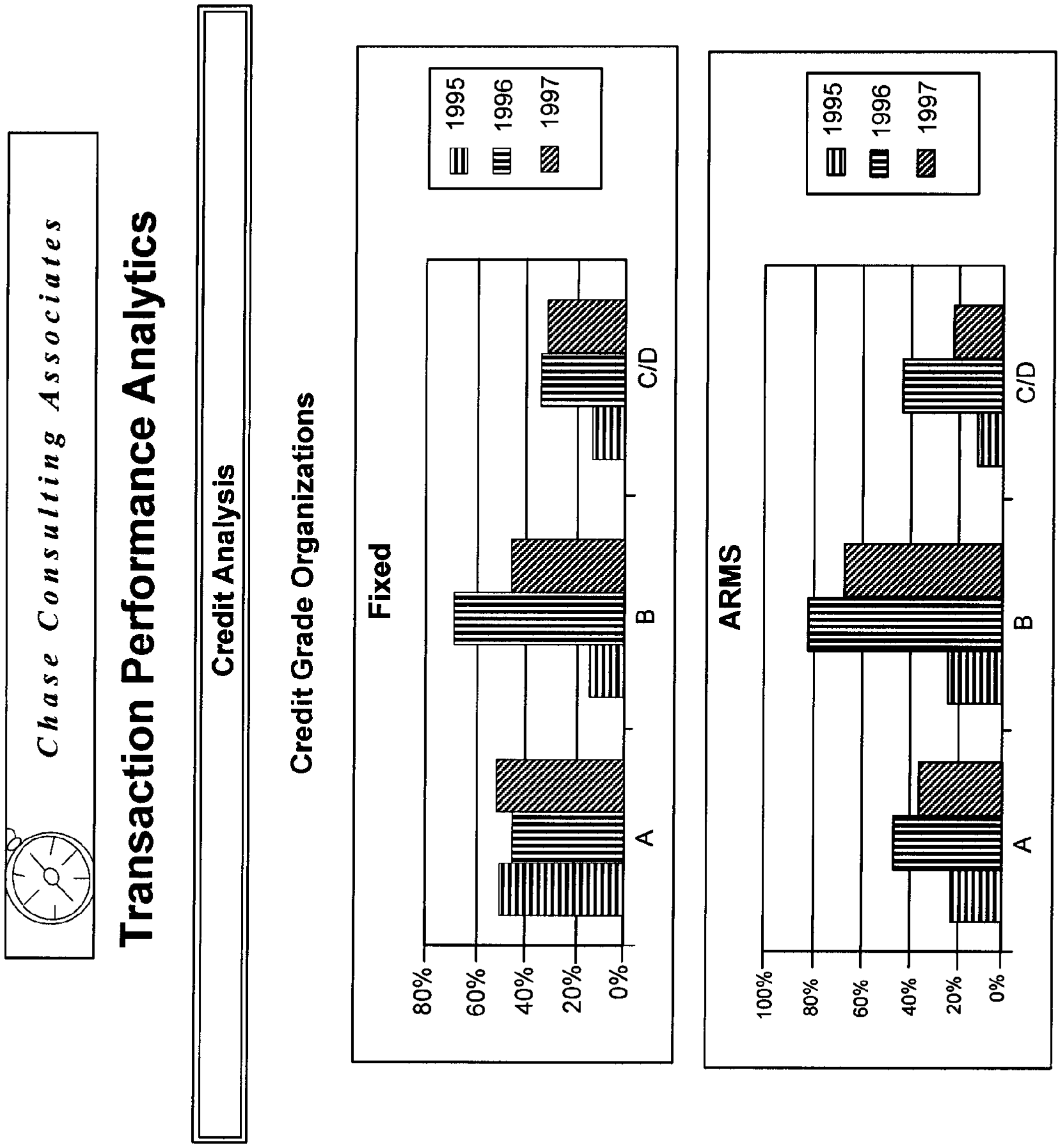

With reference to FIG. 7, the aggregate asset performance data report may also include screens containing credit analysis, such as credit grade origination data. In particular, for each type of loan (fixed/ARMS) and for each grade of credit (A, B, C/D), a percentage of loans originating in the respective grades may be illustrated in bar chart form. The data may be further categorized by year of origination (e.g., 1995, 1996 and 1997).

Figure 8:
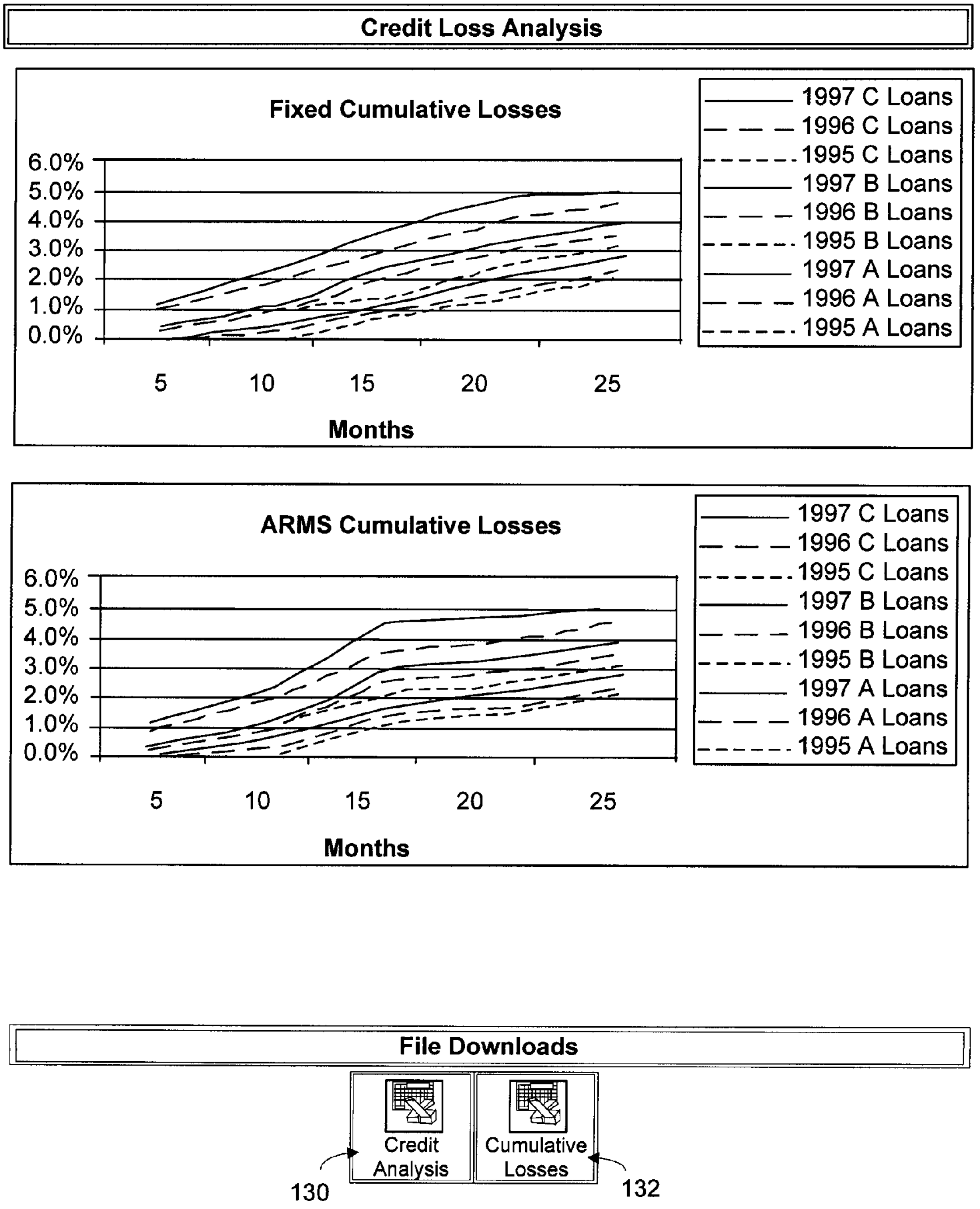

Referring to FIG. 5A or 5B, when an investor 30 selects the [loss analysis] option, the aggregate asset performance data report preferably includes screens related to credit loss analysis as shown in FIG. 8. In particular, graphs illustrating the cumulative losses for fixed rates and adjustable rate assets (i.e., loans) may be presented as a function of time (preferably months) for each grade of loans (A, B, C) and each year of origination (1995, 1996 and 1997).

The investor 30 is preferably provided with the opportunity to download the asset performance data in the reports, for example, the credit analysis and/or cumulative losses by way of download icons 130, 132, respectively. Reports in the tabular format (preferably in a spreadsheet format) may be readily downloaded by the investors 30 directly to their computers and they may perform their own analysis and report generation if they desire. Reports in the graphical format preferably include an underlying spreadsheet which also may be readily downloaded by the investors 30.

Referring to FIG. 5A or 5B, when an investor 30 selects a particular report, for example, a report for transaction 97-2 of the search results 111, he may be provided with a screen as shown in FIG. 9. The investor 30 is provided with a selection of analysis reports, such as [collateral description], [collateral prepayments], [delinquency analysis], [loss analysis], [trigger testing], [monthly loan level data], [certificate holders statement], and [all data].

Also shown is a deal description for the collateral (e.g., the transaction entitled The Money Shoppe 97-2). The deal description includes, for example, the issue date, original certificate balance, type of collateral, type of credit enhancement, etc. Additional information regarding the selected structured securities transaction may be provided which includes class, coupon, pricing spread, original par, current par, pool factor, bond type, stated maturity, original rating and current rating.

The investor 30 may also select document (or static) reports such as [prospectus], and/or [pooling and servicing agreements]. Thus, the investor 30 may review the original transaction offering documents, governing documents, rating documents, etc. associated with a particular structured securities transaction.

Preferably, a document parsing and searching function (not shown) is provided such that the investor 30 may search for selected portions of a particular document, and may download only those portions.

With reference to FIGS. 10 and 11, investor 30 (and particularly potential investors or other interested parties) may obtain information regarding the contact people associated with a particular structured securities transactions. This is preferably invoked by activating the "deal links" icon 78 in FIG. 5B or 5B. Trustee reporting deal links are shown in FIG.

10, while performance analytics deal links are shown in FIG. 11. Heretofore, this information has been difficult to obtain when one was not an investor who was a party to the transaction and, often, even then this information was not contained in one easily accessible location. According to the invention, the contact information preferably includes the issuer, underwriter, co-underwriter, bond issuer, rating agency (or agencies), trustee, master servicer, servicer, etc.

Referring again to FIG. 9, when the [collateral description] report is selected, the investor 30 may be presented with one or more screens as shown in FIGS. 12A and 12B. In particular, the asset performance of the selected transaction (i.e., The Money Shoppe 97-2) may be presented in terms of groups of assets (e.g., loans) where each loan group may be discussed and trends, performance, analysis, etc. may be provided to more fully explain the performance data. Loan to value data may also be provided. Advantageously, the group definitions may be provided and discussed in detail, thereby providing the investor 30 with information that the asset information sources 20, 22, 24 believe useful and advantageous.

When an investor 30 selects the [collateral prepayments] option (FIG. 9), he may be provided with a screen as shown in FIG. 13. In particular, the collateral prepayment asset performance data for the selected transaction (i.e., The Money Shoppe 97-2) is shown in terms of tabular data at location 136 and/or graphical data at location 138. More particularly, the constant prepayment rate (CPR) for the loans of the transaction may be presented in graphical form and may be presented in terms of the Group I and Group II definitions provided in screens 12A and 12B. Most preferably, the prepayment data is presented as a time series over a number of months (such as 14 months) and plotted against a projection so that the investor may readily see trends in the performance of the assets.

The investor 30 may be provided with a download icon 140 for downloading the underlying tabular data regarding the prepayment history of the selected transaction. Advantageously, the investor 30 may then manipulate this data as he sees fit.

With reference to FIG. 9, when an investor 30 selects the [delinquency analysis] option, he may be provided with a screen as shown in FIG. 14. This screen preferably provides graphical data as to delinquencies of 30 days, 60 days, and/or 90+ days for a current month, last month, or two previous months. Further, these graphs may be provided for each group of assets defined in FIGS. 12A and 12B. Still further, the spread account/over-collateralization may be plotted as a function of time (preferably months from issuance) and plotted against a requirement). The investor 30 may download the delinquency data and/or the spread account data by way of download icons 140, 142, respectively.

With reference to FIG. 9, when an investor 30 selects the [loss analysis] option, he may be presented with a screen as illustrated in FIG. 15. In particular, the asset performance data may be presented in terms of loans in foreclosure at location 144, loans in bankruptcy at location 146 and/or REO properties at location 148, where the number, principal balance and delinquency rate is provided in tabular form with respect to the Group I and Group II loan definitions shown in FIGS. 12A and 12B. Further, cumulative losses (percent of original collateral) may be provided in graphical format as a function of time (such as months from issuance) at location 150. Tabular data as to cumulative losses may be provided at location 152 showing the cumulative losses for the current month, last month and losses to date. The loss analysis data may be downloaded by way of icon 154.

Figure 16:
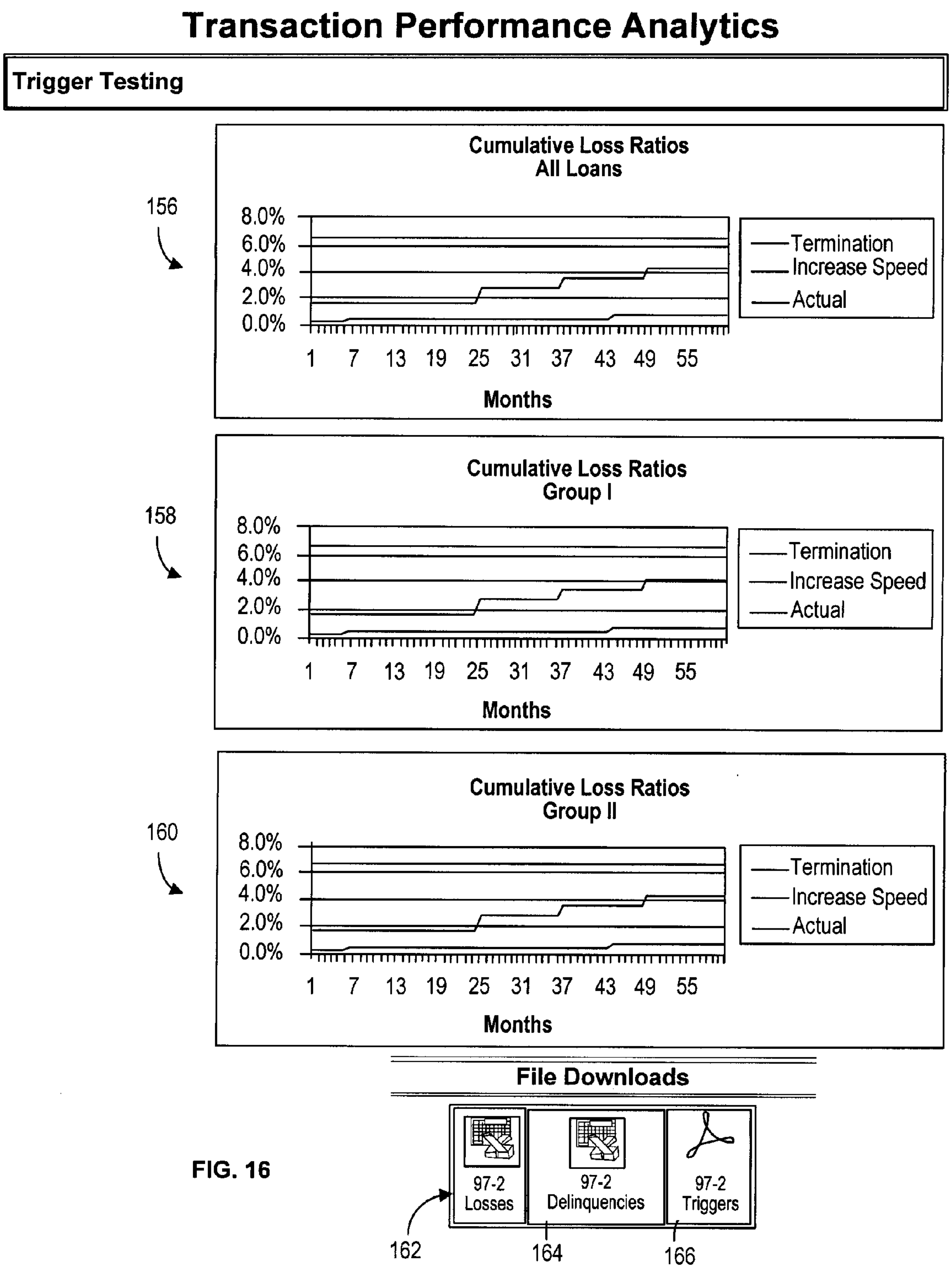

With reference to FIG. 9, when an investor 30 selects the [trigger testing] option, he may be provided with the screen illustrated in FIG. 16. In particular, actual cumulative loss ratios may be plotted against a trigger threshold such that an investor may readily see whether a trend towards reaching the trigger threshold exists. Graphs of cumulative loss ratios may be prepared for all loans at location 156, Group I loans at location 158, and/or Group II loans at location 160. Download icons may be provided which, when activated, download losses, data, delinquency data and/or trigger data, respectively.

With respect to FIG. 9, those skilled in the art will appreciate that appropriate reports may be provided to the investor 30 when he selects either of the [monthly loan level data] or [certificate holders statement] but, for simplicity, these screens are not shown herein.

Figure 17:
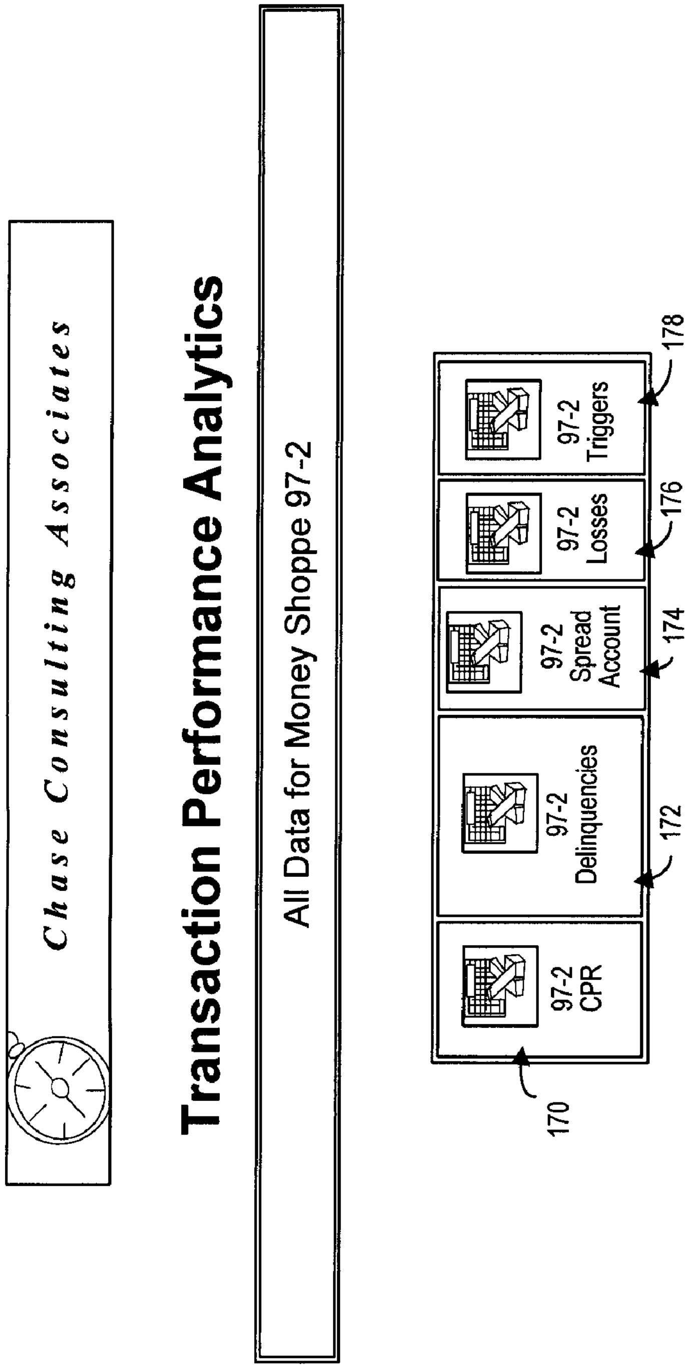

With respect to FIG. 9, when an investor 30 selects the [all data] option, he may be presented with a screen as illustrated in FIG. 17. In particular, the investor may be provided with an opportunity to view and/or download the constant prepayment rate (CPR) data 170, delinquency data 172, spread account data 174, losses data 176, and/or trigger data 177, these reports having already been described hereinabove.

Preferably, the investors 30 are provided with an opportunity to create a personalized portfolio for which they choose one or more reports to be listed on a screen without having to search anew every time that they log on. A personalized portfolio screen may be invoked by selecting an appropriate icon, where the screen contains one or more reports available for viewing. Thus, a particular investor 30 may customize the information provided on the website in a way that contains all or some of the screens discussed above.

Additionally, it is preferred that the investor 30 be provided with an opportunity to identify certain reports to be e-mailed by the financial securities provider 40 to the investor 30 on a periodic basis. This feature is preferably invoked by providing the investor 30 with one or more suitable icons (or other input means) on the screens discussed above or other screens (not shown) to define the selected reports.

It is also preferred that the investor 30 be provided with an opportunity to identify and order research reports, register for conferences, access related databases (e.g., through hyperlinks and co-branding agreements between the financial services provider 40 and other entities).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of providing users with financial reports over a computer network, comprising the steps of:

storing respective historical financial performance data for each of a plurality of securities, each security underlying at least one of a plurality of structured securities transactions sold by issuers to investors;

maintaining an electronic site on the computer network to which users may connect;

receiving search criteria over the computer network from at least one of the users, the search criteria identifying at least one structured securities transaction, the at least one structured securities transaction being associated with at least one underlying security;

retrieving historical financial performance data associated with the at least one underlying security, at least some of the historical financial performance data being arranged in a time series; and providing at least one electronic screen to the at least one user over the computer network, the at least one screen including a subset of historical financial performance data.

2. The method of claim 1, wherein the criteria is capable of identifying a subset of financial performance data which includes at least one of: (i) financial performance data for securities of more than one structured securities transaction; and (ii) financial performance data for securities underlying structured securities transactions of more than one issuer.

3. The method of claim 1, wherein the search criteria includes at least one of: (i) at least one class of structured securities transaction; and (ii) at least one of a date of origination and date before which a structured securities transaction was originated.

4. The method of claim 3, wherein the class of structured securities transaction includes at least one of an asset backed securities transaction, a mortgage backed securities transaction, and a consumer mortgage backed securities transaction.

5. The method of claim 1, wherein the search criteria includes at least one of: (i) an issuer name; (ii) an investor name; (iii) a type of security; (iv) a coupon type, when the security includes at least one loan; (v) a credit grade, when the security includes at least one loan; (vi) a loan to value ratio, when the security includes at least one loan, and (vii) property type, when the security includes real property.

6. The method of claim 5, wherein the credit grade is at least one of A, B, and C/D.

7. The method of claim 5, wherein the coupon type is at least one of a fixed rate and an adjustable rate.

8. The method of claim 1, wherein the user is not one of the issuers and the investors.

9. The method of claim 1, further comprising the step of: organizing the subset of financial performance data into at least one report including at least one of: prepayment analysis, credit loss analysis, delinquency analysis, and trigger testing analysis.

10. The method of claim 9, wherein the prepayment analysis reports include at least the constant prepayment rate of at least one loan as a function of time.

11. The method of claim 10, wherein the time at least one of days, months, and years.

12. The method of claim 10, wherein the constant prepayment rate is provided for at least one group of loans organized in terms of at least one of: (i) by year of origination; (ii) by coupon type; (iii) by credit grade; (iv) by collateral balance; and (v) by loan to value ratio.

13. The method of claim 9, wherein the credit loss analysis reports include at least the cumulative losses of at least one loan as a function of time.

14. The method of claim 13, wherein the time is at least one of days, months, and years.

15. The method of claim 14, wherein the cumulative losses are provided for at least one group of loans organized in terms of at least one of: (i) by year of origination; (ii) by coupon type; (iii) by credit grade; (iv) by collateral balance; and (v) by loan to value ratio.

16. The method of claim 9, wherein the credit loss analysis reports include at least loans in foreclosure within at least one group of loans.

17. The method of claim 16, wherein the loans in foreclosure are totaled in terms of a current month, a previous month, and to date.

18. The method of claim 16, wherein the loans in foreclosure are organized in terms of at least one of (i) by year of origination; (ii) by coupon type; (iii) by credit grade; (iv) by collateral balance; (v) by loan to value ratio; and (vi) by cumulative loss ratio.

19. The method of claim 9, wherein the delinquency analysis reports include at least the rate of delinquency of at least one group of loans as a function of time.

20. The method of claim 19, wherein the time is at least one of current month, a previous month, and two months previous.

21. The method of claim 19, wherein the rate of delinquency is provided for at least one group of loans organized in terms of at least one of: (i) by year of origination; (ii) by coupon type; (iii) by credit grade; (iv) by collateral balance; (v) by loan to value ratio; and (vi) number of days delinquent.

22. The method of claim 21, wherein the number of days delinquent is at least one of 30, 60 and 90 days.

23. The method of claim 9, wherein the trigger testing reports indicate whether the performance of an underlying pool of assets has at least one of fallen below or risen above a predetermined threshold.

24. The method of claim 23, wherein the threshold is defined in an indenture document for at least one of the structured securities transactions.

25. The method of claim 9, further comprising the step of: providing indicia which includes a least one interpretation of the at least one report.

26. The method of claim 2, further comprising the step of: organizing the subset of financial performance data into at least one aggregate analytic report including at least one of prepayment analysis, credit loss analysis, and delinquency analysis for the at least one of (i) securities of more than one structured securities transaction; and (ii) securities underlying structured securities transactions of more than one issuer.

27. The method of claim 26, wherein the delinquency analysis reports include at least an aggregate rate of delinquency of at least one group of loans as a function of time.

28. The method of claim 27, wherein the prepayment analysis reports include at least an aggregate constant prepayment rate of loans as a function of time.

29. The method of claim 27, wherein the time is at least one of a current month, a previous month, and two months previous.

30. The method of claim 29, wherein the time is at least one of days, months, and years.

31. The method of claim 29, wherein the aggregate constant prepayment rate is provided for at least one group of loans organized in terms of at least one of (i) by year of origination; (ii) by coupon type; (iii) by credit grade; (iv) by collateral balance; (v) by loan to value ratio; and (vi) by issuer.

32. The method of claim 26, wherein the credit loss analysis reports include at least the aggregate cumulative losses of loans as a function of time.

33. The method of claim 32, wherein the time is at least one of days, months, and years.

34. The method of claim 32, wherein the aggregate cumulative losses are provided for at least one group of loans organized in terms of at least one of: (i) by year of origination; (ii) by coupon type; (iii) by credit grade; (iv) by collateral balance; (v) by loan to value ratio; and (vi) by issuer.

35. The method of claim 26, wherein the credit loss analysis reports include at least aggregate loans in foreclosure within at least one group of loans.

36. The method of claim 35, wherein the aggregate loans in foreclosure are totaled in terms of a current month, a previous month, and to date.

37. The method of claim 35, wherein the aggregate loans in foreclosure are organized in terms of at least one of: (i) by year of origination; (ii) by coupon type; (iii) by credit grade; (iv) by collateral balance; (v) by loan to value ratio; (vi) by cumulative loss ratio; and (vii) by issuer.

38. The method of claim 27, wherein the aggregate rate of delinquency is provided for at least one group of loans organized in terms of at least one of: (i) by year of origination; (ii) by coupon type; (iii) by credit grade; (iv) by collateral balance; (v) by loan to value ratio; (vi) number of days delinquent; and (vii) by issuer.

39. The method of claim 38, wherein the number of days delinquent is at least one of 30, 60 and 90 days.

40. The method of claim 1 further comprising the steps of:

storing respective trustee reports for each of the plurality of securities, the trustee reports including data defined by respective indenture documents for the structured securities transactions;

receiving search criteria over the computer network from at least one of the users for identifying at least a subset of the trustee reports;

retrieving the subset of trustee reports identified by the search criteria; and providing at least one electronic screen to the at least one user over the computer network which includes the subset of trustee reports.

41. The method of claim 1, further comprising the steps of:

storing respective indenture documents for the structured securities transaction;

receiving search criteria over the computer network from at least one of the users for identifying at least a subset of the indenture documents;

retrieving the subset of indenture documents identified by the search criteria; and providing at least one electronic screen to the at least one user over the computer network which includes the subset of indenture documents.

42. The method of claim 41, wherein the indenture documents include at least one of prospectuses and pooling and servicing agreements.

43. The method of claim 42, further comprising the steps of:

receiving search criteria over the computer network from at least one of the users for identifying at least a portion of at least one indenture document;

retrieving the portion the indenture document identified by the search criteria; and providing at least one electronic screen to the at least one user over the computer network which includes the portion of the indenture documents.

44. The method of claim 1, further comprising the steps of:

storing respective contact information concerning the plurality of structured securities transactions;

receiving search criteria over the computer network from at least one of the users for identifying at least some of the contact information;

retrieving the contact information identified by the search criteria; and providing at least one electronic screen to the at least one user over the computer network which includes the identified contact information.

45. The method of claim 44, wherein the contact information includes at least one of the issuer, underwriter, co-underwriter, bond issuer, rating agency, trustee, master servicer, and servicer.

* * * * *